US011443502B2

(12) United States Patent
Lee et al.

(10) Patent No.: US 11,443,502 B2
(45) Date of Patent: Sep. 13, 2022

(54) OBJECT DETECTION POST-PROCESSING DEVICE, AND DISPLAY DEVICE INCLUDING THE SAME

(71) Applicant: Samsung Display Co., Ltd., Yongin-si (KR)

(72) Inventors: Jun Gyu Lee, Seoul (KR); Hyeon Min Kim, Gwacheon-si (KR); Kuk-Hwan Ahn, Hwaseong-si (KR); Young Wook Yoo, Suwon-si (KR); Hyun Jun Lim, Suwon-si (KR); Byung Ki Chun, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 43 days.

(21) Appl. No.: 16/865,731

(22) Filed: May 4, 2020

(65) Prior Publication Data
US 2021/0103751 A1 Apr. 8, 2021

(30) Foreign Application Priority Data

Oct. 8, 2019 (KR) ........................ 10-2019-0124654

(51) Int. Cl.
*G06V 10/20* (2022.01)
*G06T 7/187* (2017.01)
(Continued)

(52) U.S. Cl.
CPC ............ *G06V 10/255* (2022.01); *G06T 7/187* (2017.01); *G06T 7/70* (2017.01); *G06V 10/768* (2022.01)

(58) Field of Classification Search
CPC ...... G06K 9/3241; G06K 9/72; G06K 9/4628; G06K 9/3233; G06K 9/00228;
(Continued)

(56) References Cited

U.S. PATENT DOCUMENTS

| 7,391,907 | B1 * | 6/2008 | Venetianer | ......... G06K 9/00771 |
| | | | | 382/103 |
| 2010/0296131 | A1 * | 11/2010 | Zahnert | .................. G06K 9/228 |
| | | | | 358/450 |
| 2021/0042935 | A1 * | 2/2021 | Hiroi | ....................... G06T 7/277 |

FOREIGN PATENT DOCUMENTS

| CN | 109919149 A | 6/2019 |
| JP | WO-2021060136 A1 * | 9/2019 ............... G06T 7/70 |

(Continued)

OTHER PUBLICATIONS

Internet: "Real-time Object Detection with YOLO, YOLOv2 and now YOLOv3," Retrieved from Internet URL: https://medium.com/@jonathan_hui/real-time-object-detection-with-yolo-yolov2-28b1b93e2088, 19 pages.

(Continued)

Primary Examiner — Zhitong Chen
(74) Attorney, Agent, or Firm — Lewis Roca Rothgerber Christie LLP

(57) ABSTRACT

An object detection post-processing device of a display device, includes: an input to receive position information of an object that is detected from input image data for the display device in a current frame; a position information storage device to accumulatively store the position information of a plurality of previous frames; an accumulated position calculator to generate accumulated position information according to the position information of the current frame and the position information of the plurality of previous frames; and a position information determiner to determine final position information according to the accumulated position information, and to output the final position information.

19 Claims, 16 Drawing Sheets

(51) Int. Cl.
*G06V 10/70* (2022.01)
*G06T 7/70* (2017.01)

(58) Field of Classification Search
CPC ......... G06K 9/6274; G06T 7/187; G06T 7/11;
G06T 7/70; G09G 3/006
See application file for complete search history.

(56) References Cited

FOREIGN PATENT DOCUMENTS

| | | |
|---|---|---|
| KR | 10-2018-0051367 A | 5/2018 |
| KR | 10-2018-0065856 A | 6/2018 |
| KR | 10-1889025 B1 | 8/2018 |

OTHER PUBLICATIONS

Internet: "YOLO Algorithm and YOLO Object Detection: An Introduction," Retrieved from Internet URL: https://appsilon.com/object-detection-yolo-algorithm/, 5 pages.

* cited by examiner

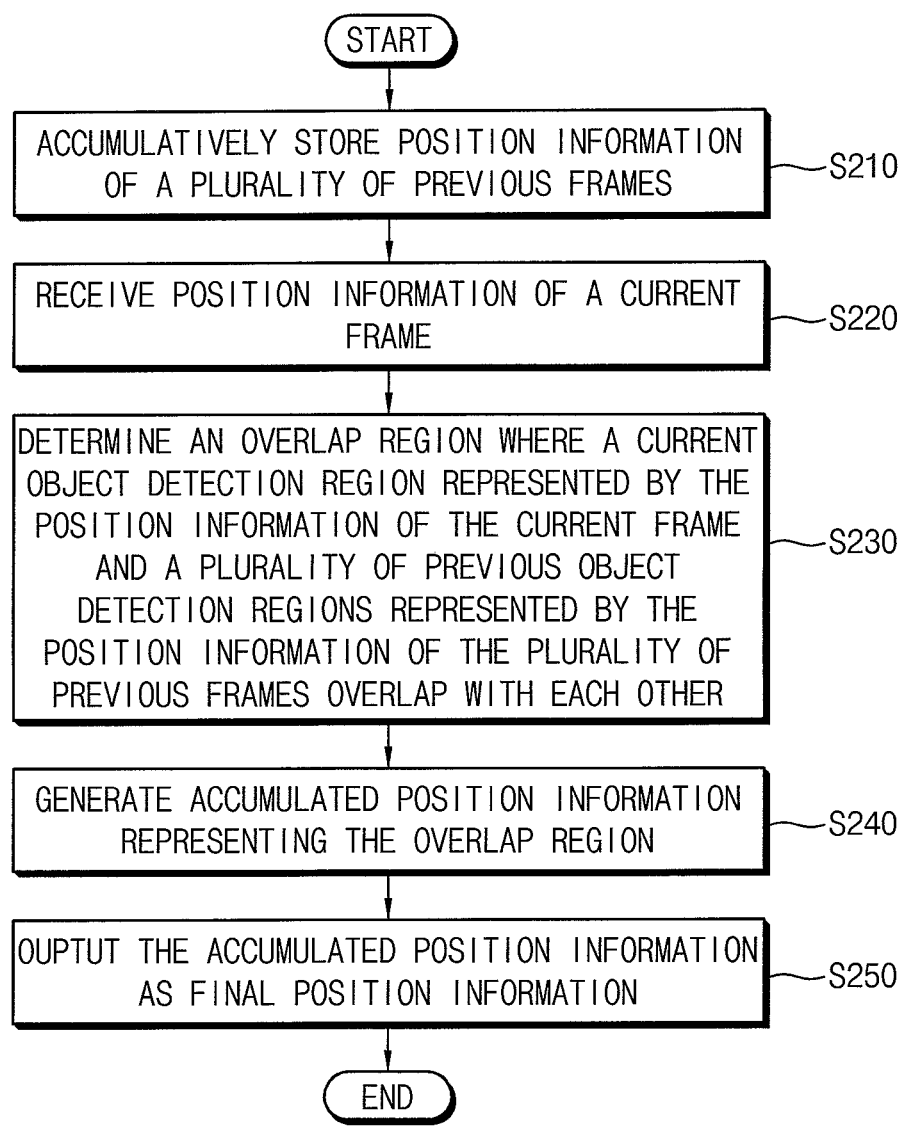

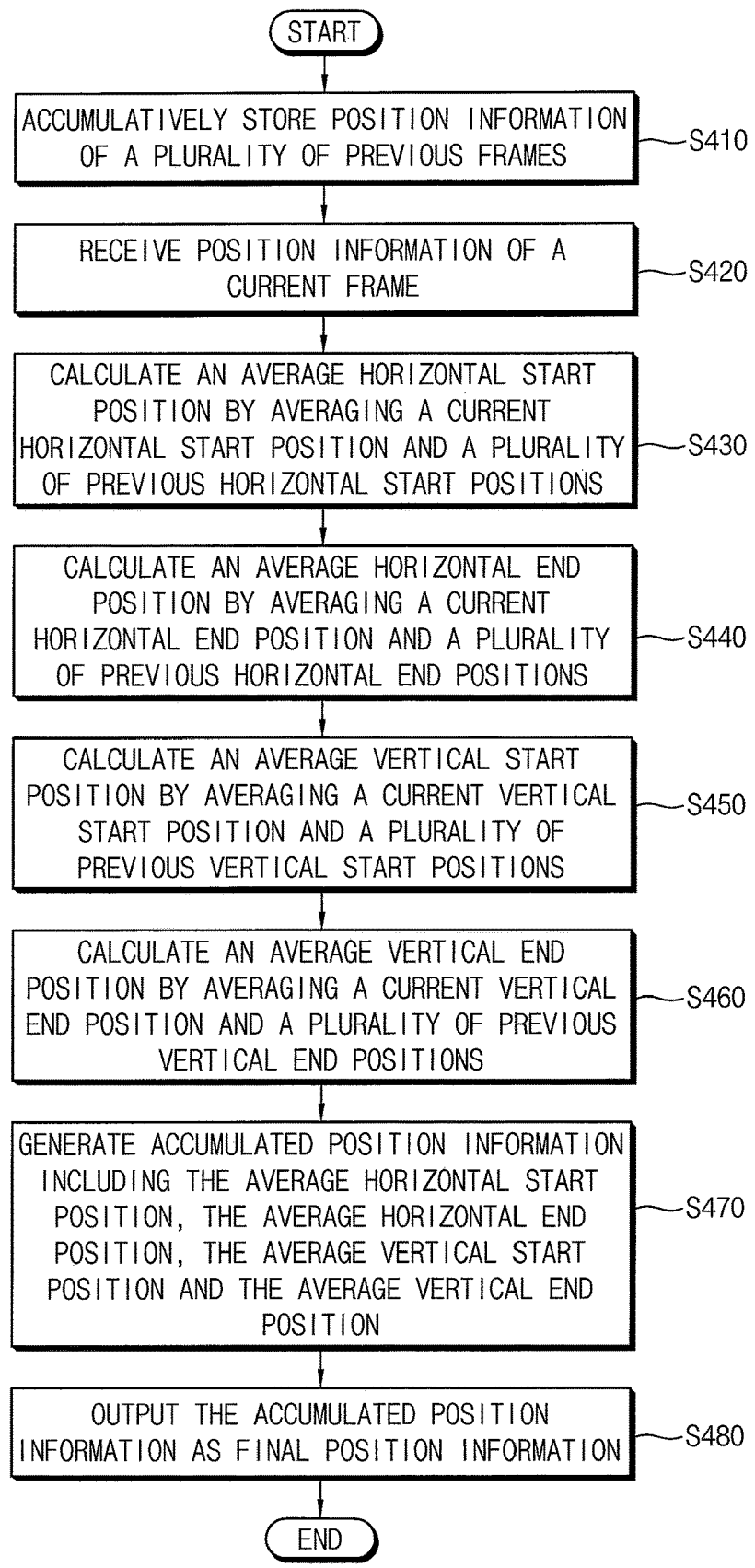

FIG. 9

| STATE | STATE NO. | OBJECT DETECTED | # OF PPI < FIRST NUMBER | POSITION CHANGE | CHANNEL CHANGE |
|---|---|---|---|---|---|
| NON-OUTPUT | 1 | 0 | X | X | X |
| PROMPT OUTPUT | 2 | 1 | 1 | X | X |
| ACCUMULATED OUTPUT | 3 | 1 | 0 | 0 | X |
| PREVIOUS ACCUMULATED OUTPUT | 4 | 1 | 0 | 1 | 0 |
| CHANNEL CHANGE | 5 | 1 | 0 | 1 | 1 |

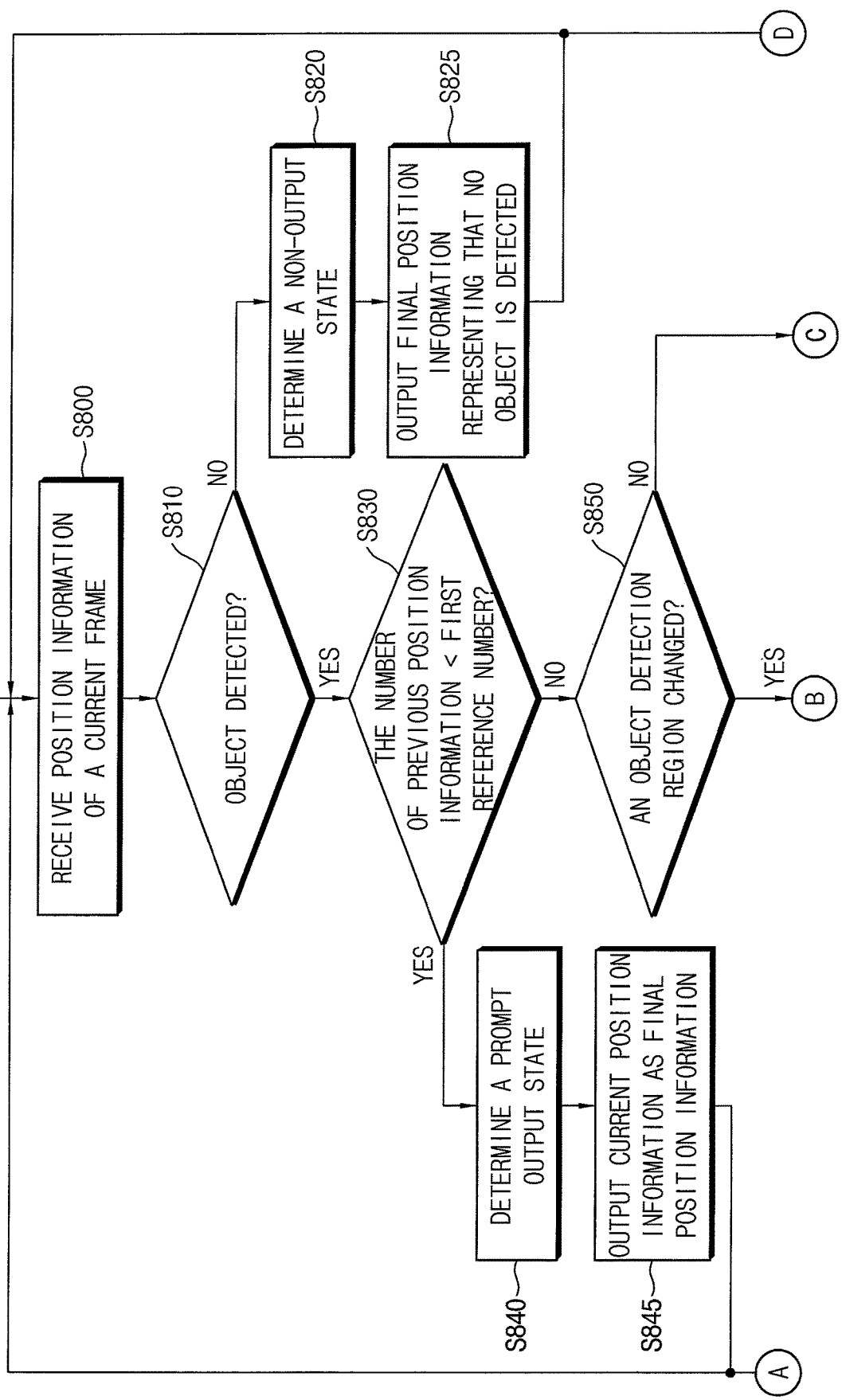

OBJECT DETECTION POST-PROCESSING DEVICE, AND DISPLAY DEVICE INCLUDING THE SAME

CROSS-REFERENCE TO RELATED APPLICATION

This application claims priority to and the benefit of Korean Patent Applications No. 10-2019-0124654, filed on Oct. 8, 2019 in the Korean Intellectual Property Office (KIPO), the entire disclosure of which is incorporated by reference herein.

BACKGROUND

1. Field

Aspects of example embodiments relate generally to display devices. More particularly, aspects of example embodiments relate to object detection post-processing devices, and display devices including the object detection post-processing devices.

2. Description of the Related Art

Recently, an object detection technique has been developed which detects an object in an image by using an artificial intelligence (AI) technique that mimics human cognition. For example, object detection techniques using deep learning convolutional neural networks (CNNs) or recurrent neural networks (RNNs) have been developed.

However, in these object detection techniques, even if an object has a fixed position in an image, a position or an object detection region of the object may be changed when a background of the image is changed.

The above information disclosed in this Background section is for enhancement of understanding of the background of the present disclosure, and therefore, it may contain information that does not constitute prior art.

SUMMARY

Some example embodiments are directed to an object detection post-processing device that outputs stable and accurate position information.

Some example embodiments are directed to a display device including an object detection post-processing device that outputs stable and accurate position information.

According to one or more example embodiments of the present disclosure, an object detection post-processing device of a display device, includes: an input configured to receive position information of an object that is detected from input image data for the display device in a current frame; a position information storage device configured to accumulatively store the position information of a plurality of previous frames; an accumulated position calculator configured to generate accumulated position information according to the position information of the current frame and the position information of the plurality of previous frames; and a position information determiner configured to determine final position information according to the accumulated position information, and to output the final position information.

In an example embodiment, the position information may represent a rectangular object detection region for the detected object.

In an example embodiment, the accumulated position calculator may be configured to determine an overlapping region where a current object detection region represented by the position information of the current frame and a plurality of previous object detection regions represented by the position information of the plurality of previous frames overlap with each other, and to generate the accumulated position information representing the overlapping region.

In an example embodiment, the position information may include a horizontal start position, a horizontal end position, a vertical start position, and a vertical end position to represent a rectangular object detection region for the detected object.

In an example embodiment, the accumulated position calculator may be configured to: calculate an average horizontal start position by averaging a current horizontal start position included in the position information of the current frame and a plurality of previous horizontal start positions included in the position information of the plurality of previous frames; calculate an average horizontal end position by averaging a current horizontal end position included in the position information of the current frame and a plurality of previous horizontal end positions included in the position information of the plurality of previous frames; calculate an average vertical start position by averaging a current vertical start position included in the position information of the current frame and a plurality of previous vertical start positions included in the position information of the plurality of previous frames; calculate an average vertical end position by averaging a current vertical end position included in the position information of the current frame and a plurality of previous vertical end positions included in the position information of the plurality of previous frames; and generate the accumulated position information including the average horizontal start position, the average horizontal end position, the average vertical start position, and the average vertical end position.

In an example embodiment, the accumulated position calculator may be configured to: calculate a median horizontal start position by calculating a median value of a current horizontal start position included in the position information of the current frame and a plurality of previous horizontal start positions included in the position information of the plurality of previous frames; calculate a median horizontal end position by calculating a median value of a current horizontal end position included in the position information of the current frame and a plurality of previous horizontal end positions included in the position information of the plurality of previous frames; calculate a median vertical start position by calculating a median value of a current vertical start position included in the position information of the current frame and a plurality of previous vertical start positions included in the position information of the plurality of previous frames; calculate a median vertical end position by calculating a median value of a current vertical end position included in the position information of the current frame and a plurality of previous vertical end positions included in the position information of the plurality of previous frames; and generate the accumulated position information including the median horizontal start position, the median horizontal end position, the median vertical start position, and the median vertical end position.

In an example embodiment, the position information storage device is configured to store the position information in a first in first out (FIFO) manner such that an oldest position information from among the position information of the plurality of previous frames is deleted when the position information of the current frame is stored.

In an example embodiment, the object detection post-processing device may further include: a state determiner configured to generate state information representing one of a non-output state, a prompt output state, an accumulated output state, a previous accumulated output state, and a channel change state as an operating state of the object detection post-processing device, and the position information determiner may be configured to determine the final position information according to the state information and the accumulated position information.

In an example embodiment, the state determiner may be configured to determine the non-output state as the operating state when the position information of the current frame represents that no object is detected, and the position information determiner may be configured to determine the position information of the current frame representing that no object is detected as the final position information in response to the state information representing the non-output state.

In an example embodiment, the state determiner may be configured to determine the prompt output state as the operating state when the object is detected, and the position information storage device stores the position information of the previous frames in a number that is less than a first reference number, and the position information determiner may be configured to determine the position information of the current frame as the final position information in response to the state information representing the prompt output state.

In an example embodiment, the state determiner may be configured to determine the accumulated output state as the operating state when the object is detected, and the position information storage device stores the position information of the previous frames in a number that is greater than or equal to a first reference number, and the position information determiner may be configured to determine the accumulated position information as the final position information in response to the state information representing the accumulated output state.

In an example embodiment, the object detection post-processing device may further include: a position change determiner configured to compare a difference between a current object detection region represented by the position information of the current frame and a previous object detection region represented by the position information of at least one of the previous frames with a reference position difference, and to determine that an object detection region of the detected object is changed when the difference between the current object detection region and the previous object detection region is greater than or equal to the reference position difference; and a channel change determiner configured to determine that an image channel is changed when the object detection region of the detected object is determined to be changed, and the changed object detection region of the detected object is constant during a second reference number of frames. The state determiner may be configured to determine the previous accumulated output state as the operating state when the object is detected, the position information storage device stores the position information of the previous frames in a number that is greater than or equal to a first reference number, the object detection region of the detected object is determined to be changed, and the changed object detection region of the detected object is not constant during the second reference number of frames. The position information determiner may be configured to determine the accumulated position information except for the position information of the current frame as the final position information in response to the state information representing the previous accumulated output state.

In an example embodiment, the state determiner may be configured to determine the channel change state as the operating state when the object is detected, the position information storage device stores the position information of the previous frames in the number that is greater than or equal to the first reference number, the object detection region of the detected object is determined to be changed, and the changed object detection region of the detected object is constant during the second reference number of frames. In response to the state information representing the channel change state, the position information determiner may be configured to reset the position information storage device such that the position information of the plurality of previous frames stored in the position information storing unit is deleted, and to determine the position information of the current frame as the final position information.

According to one or more example embodiments of the present disclosure, an object detection post-processing device of a display device, includes: an input configured to receive position information of an object that is detected from input image data for the display device in a current frame; a position information storage device configured to accumulatively store the position information of a plurality of previous frames; a state determiner configured to generate state information representing one of a non-output state, a prompt output state, an accumulated output state, a previous accumulated output state, and a channel change state as an operating state of the object detection post-processing device; an accumulated position calculator configured to generate accumulated position information according to the position information of the current frame and the position information of the plurality of previous frames when the state information represents the accumulated output state, and to generate the accumulated position information according to the position information of the plurality of previous frames when the state information represents the previous accumulated output state; and a position information determiner configured to determine final position information according to the state information and the accumulated position information, and to output the final position information.

In an example embodiment, the state determiner may be configured to determine the non-output state as the operating state when the position information of the current frame represents that no object is detected, and the position information determiner may be configured to determine the position information of the current frame representing that no object is detected as the final position information in response to the state information representing the non-output state.

In an example embodiment, the state determiner may be configured to determine the prompt output state as the operating state when the object is detected, and the position information storage device stores the position information of the previous frames in a number that is less than a first reference number, and the position information determiner may be configured to determine the position information of the current frame as the final position information in response to the state information representing the prompt output state.

In an example embodiment, the state determiner may be configured to determine the accumulated output state as the operating state when the object is detected, and the position information storage device stores the position information of the previous frames in a number that is greater than or equal to a first reference number, and the position information determiner may be configured to determine the accumulated position information generated according to the position information of the current frame and the position information of the plurality of previous frames as the final position information in response to the state information representing the accumulated output state.

In an example embodiment, the object detection post-processing device may further include: a position change determiner configured to compare a difference between a current object detection region represented by the position information of the current frame and a previous object detection region represented by the position information of at least one of the previous frames with a reference position difference, and to determine that an object detection region of the detected object is changed when the difference between the current object detection region and the previous object detection region is greater than or equal to the reference position difference; and a channel change determiner configured to determine that an image channel is changed when the object detection region of the detected object is determined to be changed, and the changed object detection region of the detected object is constant during a second reference number of frames. The state determiner may be configured to determine the previous accumulated output state as the operating state when the object is detected, the position information storage device stores the position information of the previous frames in a number that is greater than or equal to a first reference number, the object detection region of the detected object is determined to be changed, and the changed object detection region of the detected object is not constant during the second reference number of frames. The position information determiner may be configured to determine the accumulated position information generated according to the position information of the plurality of previous frames as the final position information in response to the state information representing the previous accumulated output state.

In an example embodiment, the state determiner may be configured to determine the channel change state as the operating state when the object is detected, the position information storage device stores the position information of the previous frames in the number that is greater than or equal to the first reference number, the object detection region of the detected object is determined to be changed, and the changed object detection region of the detected object is constant during the second reference number of frames. In response to the state information representing the channel change state, the position information determiner may be configured to reset the position information storage device such that the position information of the plurality of previous frames stored in the position information storage device is deleted, and to determine the position information of the current frame as the final position information.

According to one or more example embodiments of the present disclosure, a display device includes: a display panel including a plurality of pixels; a data driver configured to provide data signals corresponding to output image data to the plurality of pixels; a scan driver configured to provide scan signals to the plurality of pixels; and a controller configured to control the data driver and the scan driver, the controller including: an object detection device configured to detect an object from input image data to generate position information of the detected object; an object detection post-processing device configured to determine final position information according to the position information of the detected object; and a data compensation device configured to generate the output image data by compensating the input image data according to the final position information. The object detection post-processing device includes: an input configured to receive the position information of a current frame; a position information storage device configured to accumulatively store the position information of a plurality of previous frames; an accumulated position calculator configured to generate accumulated position information according to the position information of the current frame and the position information of the plurality of previous frames; and a position information determiner configured to determine the final position information according to the accumulated position information, and to output the final position information.

According to one or more example embodiments described above, an object detection post-processing device and a display device including the object detection post-processing device according to one or more example embodiments may accumulatively store position information of a plurality of previous frames, may generate accumulated position information according to (e.g., based on) the position information of a current frame and the position information of the plurality of previous frames, and may output the accumulated position information as final position information. Accordingly, the object detection post-processing device may output stable and accurate position information even if position information is input that fluctuates or has a variation (e.g., a deviation).

BRIEF DESCRIPTION OF THE DRAWINGS

The above and other aspects and features of the present disclosure will become more apparent to those skilled in the art from the following detailed description of the illustrative, non-limiting example embodiments with reference to the accompanying drawings.

FIG. 2 is a flowchart illustrating an operation of an object detection post-processing device according to one or more example embodiments.

FIG. 4 is a flowchart illustrating an operation of an object detection post-processing device according to one or more example embodiments.

FIG. 9 is a diagram illustrating examples of operating stages determined by a state deciding unit illustrated in FIG. 8.

FIGS. 11A-11B are flowcharts illustrating operations of an object detection post-processing device according to one or more example embodiments.

DETAILED DESCRIPTION

Figure 1:
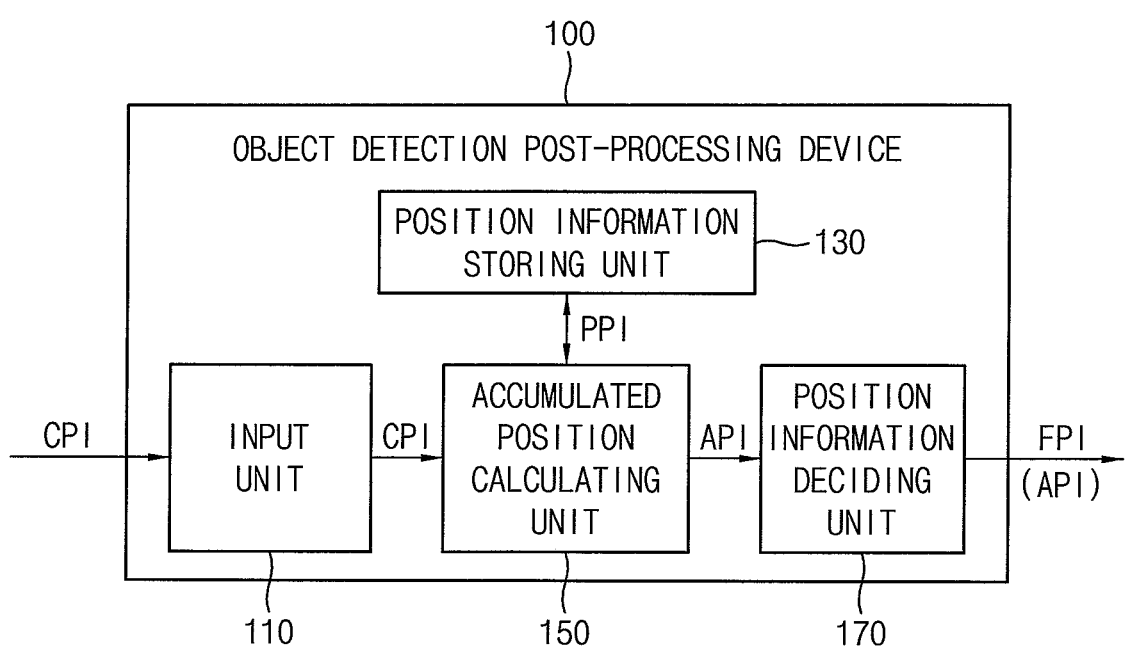
FIG. 1 is a block diagram illustrating an object detection post-processing device according to one or more example embodiments.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating an object detection post-processing device according to one or more example embodiments.

Referring to FIG. 1, an object detection post-processing device 100 in a display device may include an input unit (e.g., an input or an input circuit) 110, a position information storing unit (e.g., a position information storage device) 130, an accumulated position calculating unit (e.g., an accumulated position calculator or an accumulated position calculating circuit) 150, and a position information deciding unit (e.g., a position information determiner or a position information deciding circuit) 170.

The input unit 110 may receive position information CPI of an object that is detected by an object detection device from input image data for the display device in a current frame. In some example embodiments, the input unit 110 may delay a timing control signal (e.g., a vertical synchronization signal, a horizontal synchronization signal, a data enable signal, and/or the like) by a processing time of the object detection post-processing device 100. Further, in some example embodiments, the object detection device may detect the object from the input image data by using an artificial intelligence (AI) technique, and may generate the position information CPI and/or classification information of the detected object. For example, the object detection device may detect the object by using deep learning convolutional neural networks (CNNs) or recurrent neural networks (RNNs). According to example embodiments, the object detection device may be included in the display device, or may be included in a host processor for the display device. In some example embodiments, the position information CPI may represent a rectangular object detection region for the detected object. For example, the position information CPI may include a horizontal start position of the object detection region, a horizontal end position of the object detection region, a vertical start position of the object detection region, and a vertical end position of the object detection region.

The position information storing unit 130 may accumulatively store the position information PPI of a plurality of previous frames. In some example embodiments, the position information storing unit 130 may store the position information CPI of the current frame to be used for subsequent frames. For example, the position information storing unit 130 may store the position information CPI in a first in first out (FIFO) manner such that the oldest position information from among the position information PPI of the plurality of previous frames may be deleted when the position information CPI of the current frame is stored. Accordingly, in some example embodiments, the position information PPI for a first reference number of the previous frames may be maintained or substantially maintained (e.g., may be stored) in the position information storing unit 130.

The accumulated position calculating unit 150 may generate accumulated position information API according to (e.g., based on) the position information CPI of the current frame and the position information PPI of the plurality of previous frames. In some example embodiments, the accumulated position calculating unit 150 may determine an overlap region (e.g., an overlapping region) where a current object detection region represented by the position information CPI of the current frame and a plurality of previous object detection regions represented by the position information PPI of the plurality of previous frames overlap with each other, and may generate the accumulated position information API representing the overlap region. In other example embodiments, the accumulated position calculating unit 150 may determine an average object detection region of the current object detection region and the plurality of previous object detection regions, and may generate the accumulated position information API representing the average object detection region. In still other example embodiments, the accumulated position calculating unit 150 may determine a median object detection region of the current object detection region and the plurality of previous object detection regions, and may generate the accumulated position information API representing the median object detection region.

The position information deciding unit 170 may determine final position information FPI according to (e.g., based on) the accumulated position information API, and may output the final position information FPI. In some example embodiments, the position information deciding unit 170 may determine the accumulated position information API as the final position information FPI, and may output the accumulated position information API as the final position information FPI. In other example embodiments, the position information deciding unit 170 may output the position information CPI of the current frame as the final position information FPI, for example, in a case where the position information storing unit 130 stores the position information PPI of the previous frames in a number that is less than the first reference number, and/or may output the accumulated position information API as the final position information FPI, for example, in a case where the position information storing unit 130 stores the position information PPI of the previous frames in a number that is greater than or equal to the first reference number.

Although the object detection device using the AI, or the deep learning CNNs or RNNs may learn various images and objects, the object detection device may not learn all background images (e.g., it may not be practical for the object detection device to learn all possible background images). Accordingly, even if an object has a fixed position in an image represented by the input image data, the position information CPI generated by the object detection device may fluctuate or may have a variation (e.g., a deviation) when a background image is changed in the image represented by the input image data.

However, the object detection post-processing device 100 according to one or more example embodiments may accumulatively store the position information PPI of the plurality of previous frames, may generate the accumulated position information API according to (e.g., based on) the position information CPI of the current frame and the position information PPI of the plurality of previous frames, and may output the accumulated position information API as the final position information FPI. Accordingly, even if the position information CPI received from the object detection device fluctuates or has the variation (e.g., the deviation), the object detection post-processing device 100 according to one or more example embodiments may output a more stable and more accurate final position information FPI.

Figure 3A:
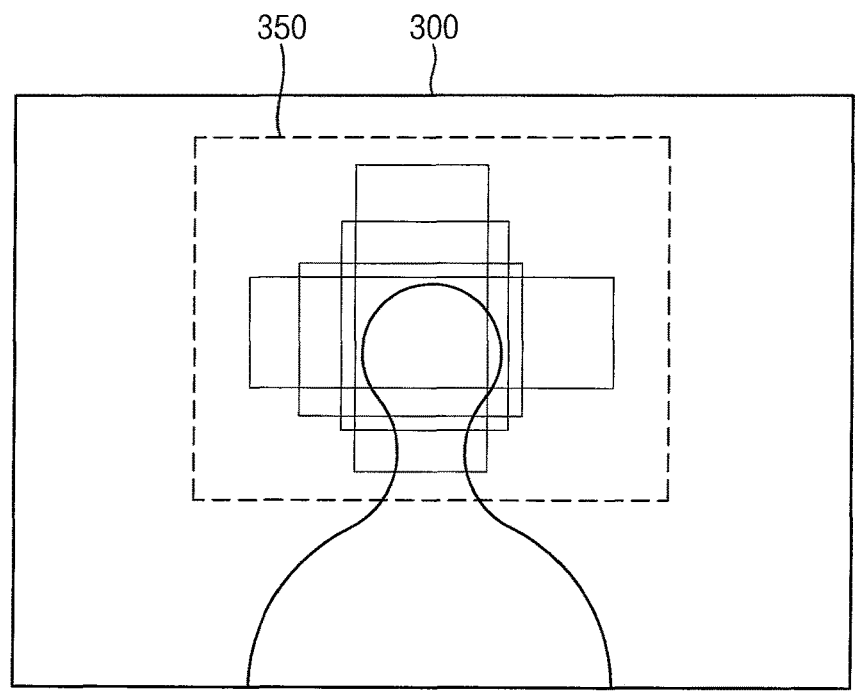
FIG. 3A is a diagram illustrating an example of an image where an object is detected.
Figure 3B:
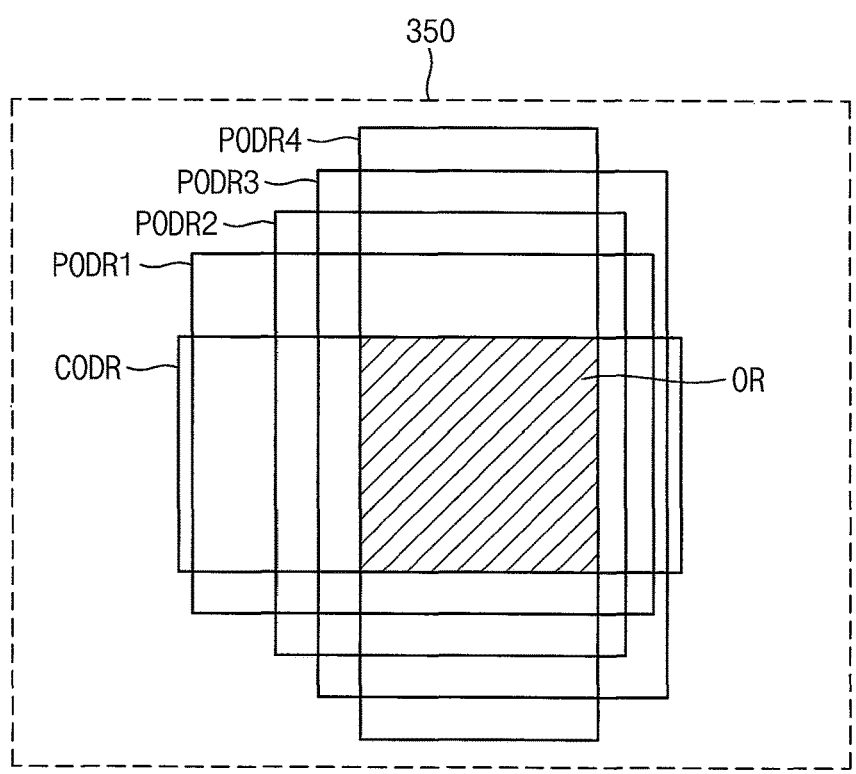
FIG. 3B is a diagram illustrating a portion of the image of FIG. 3A for an example of an operation of an object detection post-processing device according to one or more example embodiments.

FIG. 2 is a flowchart illustrating an operation of an object detection post-processing device according to one or more example embodiments, FIG. 3A is a diagram illustrating an example of an image where an object is detected, and FIG. 3B is a diagram illustrating a portion of the image of FIG. 3A for an example of an operation of an object detection post-processing device according to one or more example embodiments.

Referring to FIGS. 1 and 2, a position information storing unit (e.g., a position information storage device) 130 of an object detection post-processing device 100 may accumulatively store position information PPI of a plurality of previous frames (S210), and an input unit (e.g., an input or an input circuit) 110 of the object detection post-processing device 100 may receive the position information CPI of a current frame from an object detection device (S220). An accumulated position calculating unit (e.g., an accumulated position calculator or an accumulated position calculating circuit) 150 of the object detection post-processing device 100 may determine an overlap region (e.g., an overlapping region) where a current object detection region represented by the position information CPI of the current frame and a plurality of previous object detection regions represented by the position information PPI of the plurality of previous frames overlap with each other (S230), and may generate accumulated position information API representing the overlap region (S240).

For example, as illustrated in FIG. 3A, the object detection device may detect an object, for example, a face, in an image 300 represented by input image data, and may provide the position information CPI representing a rectangular object detection region in which the face is located to the object detection post-processing device 100. Although FIG. 3A illustrates an example where the face is detected by the object detection device, the object detected by the object detection device is not limited thereto. For example, the object detected by the object detection device may be any suitable object, such as a product, a logo, a high dynamic range object, and/or the like. The object detection post-processing device 100 may accumulatively store the position information CPI received for respective frames.

FIG. 3B illustrates the portion 350 of the image 300 shown in FIG. 3A. As illustrated in FIG. 3B, in a case where a background of the image 300 or the portion 350 of the image 300 is changed, the current object detection region CODR represented by the position information CPI of the current frame and the plurality of previous object detection regions PODR1, PODR2, PODR3, and PODR4 represented by the position information PPI of the plurality of previous frames may be different from each other. However, the accumulated position calculating unit 150 of the object detection post-processing device 100 may determine the overlap region OR where the current object detection region CODR and the plurality of previous object detection regions PODR1, PODR2, PODR3, and PODR4 overlap with each other, and may generate the accumulated position information API representing the overlap region OR. Further, a position information deciding unit (e.g., a position information determiner or a position information deciding circuit) 170 of the object detection post-processing device 100 may output the accumulated position information API representing the overlap region OR as final position information FPI (S250).

Accordingly, the object detection post-processing device 100 according to one or more example embodiments may output the stable and accurate accumulated position information API as the final position information FPI. Although FIG. 3B illustrates an example where the accumulated position information API is generated by using one current object detection region CODR represented by one current position information CPI and four previous object detection regions PODR1, PODR2, PODR3 and PODR4 represented by four previous position information PPI, the number of the current position information CPI and the previous position information PPI used in generating the accumulated position information API is not be limited to the example of FIG. 3B.

Figure 5:
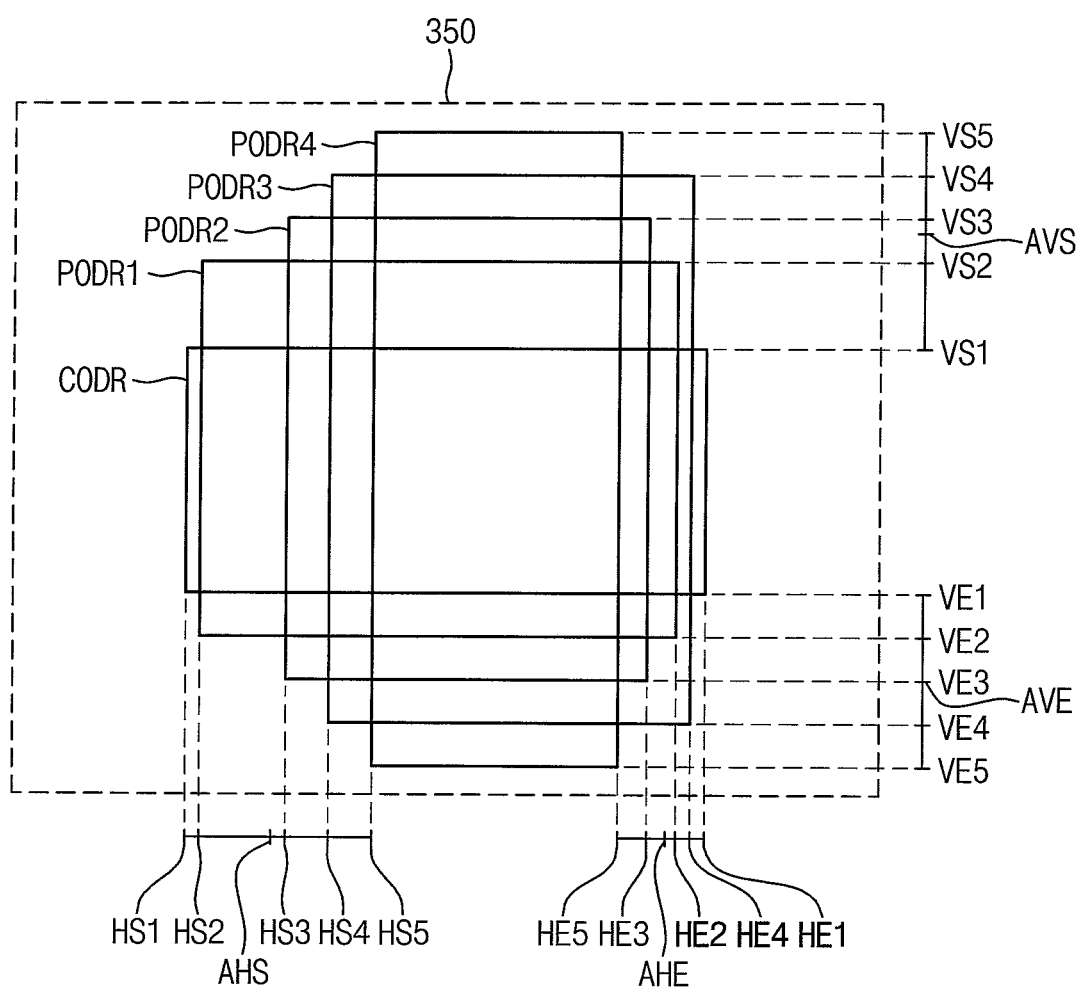
FIG. 5 is a diagram illustrating a portion of the image of FIG. 3A for an example of an operation of an object detection post-processing device according to one or more example embodiments.

FIG. 4 is a flowchart illustrating an operation of an object detection post-processing device according to one or more example embodiments, and FIG. 5 is a diagram illustrating a portion of the image of FIG. 3A for an example of an operation of an object detection post-processing device according to one or more example embodiments.

Referring to FIGS. 1 and 4, a position information storing unit (e.g., a position information storage device) 130 of an object detection post-processing device 100 may accumulatively store position information PPI of a plurality of previous frames (S410), and an input unit (e.g., an input or an input circuit) 110 of the object detection post-processing device 100 may receive the position information CPI of a current frame from an object detection device (S420). An accumulated position calculating unit (e.g., an accumulated position calculator or an accumulated position calculating circuit) 150 of the object detection post-processing device 100 may determine an average object detection region of a current object detection region represented by the position information CPI of the current frame and a plurality of previous object detection regions represented by the position information PPI of the plurality of previous frames (S430 through S460), and may generate accumulated position information API representing the average object detection region (S470).

For example, as illustrated in FIG. 5, the accumulated position calculating unit 150 may calculate an average horizontal start position AHS by averaging a current horizontal start position HS1 of the current object detection region CODR and a plurality of previous horizontal start positions HS2, HS3, HS4, and HS5 of the plurality of previous object detection regions PODR1, PODR2, PODR3, and PODR4 (S430). The accumulated position calculating unit 150 may calculate an average horizontal end position AHE by averaging a current horizontal end position HE1 of the current object detection region CODR and a plurality of previous horizontal end positions HE2, HE3, HE4, and HE5 of the plurality of previous object detection regions PODR1, PODR2, PODR3, and PODR4 (S440). The accumulated position calculating unit 150 may calculate an average vertical start position AVS by averaging a current vertical start position VS1 of the current object detection region CODR and a plurality of previous vertical start positions VS2, VS3, VS4, and VS5 of the plurality of previous object detection regions PODR1, PODR2, PODR3, and PODR4 (S450). The accumulated position calculating unit 150 may calculate an average vertical end position AVE by averaging a current vertical end position VE1 of the current object detection region CODR and a plurality of previous vertical end positions VE2, VE3, VE4, and VE5 of the plurality of previous object detection regions PODR1, PODR2, PODR3, and PODR4 (S460). Further, the accumulated position calculating unit 150 may generate the accumulated position information API including the average horizontal start position AHS, the average horizontal end position AHE, the average vertical start position AVS, and the average vertical end position AVE (S470). A position information deciding unit (e.g., a position information determiner or a position information deciding circuit) 170 of the object detection post-processing device 100 may output the accumulated position information API including the average horizontal start position AHS, the average horizontal end position AHE, the average vertical start position AVS, and the average vertical end position AVE as final position information FPI (S480). Accordingly, the object detection post-processing device 100 according to one or more example embodiments may output the stable and accurate accumulated position information API as the final position information FPI.

Figure 6:
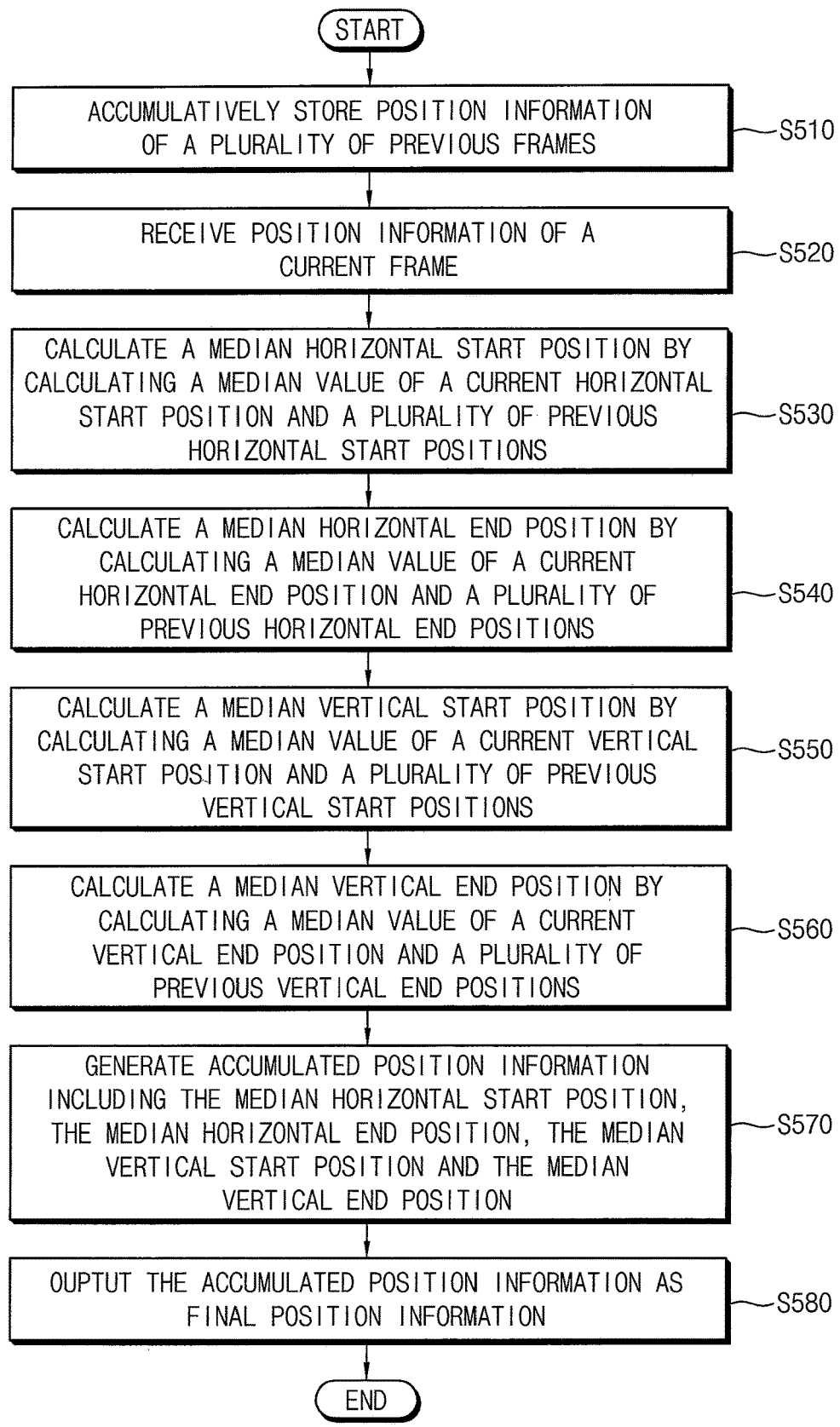
FIG. 6 is a flowchart illustrating an operation of an object detection post-processing device according to one or more example embodiments.
Figure 7:
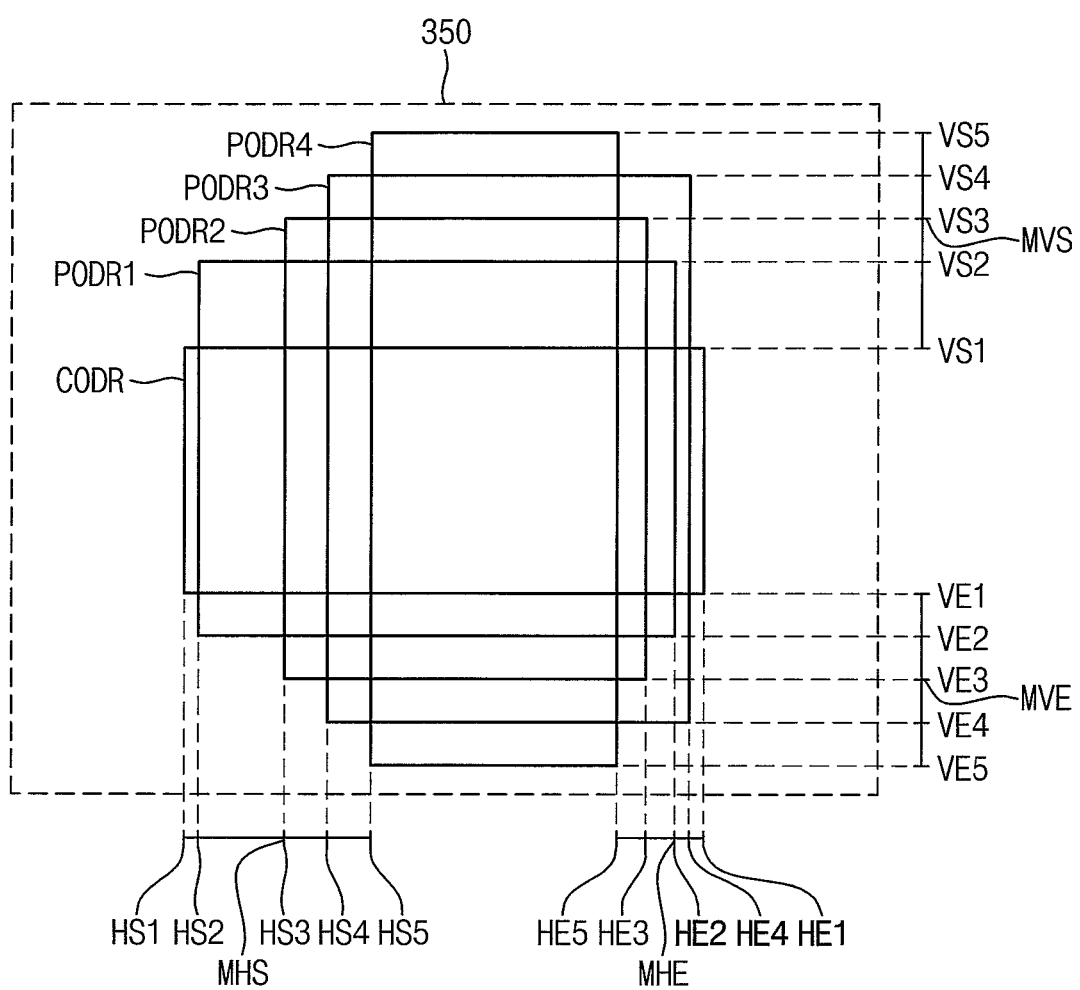
FIG. 7 is a diagram illustrating a portion of the image of FIG. 3A for an example of an operation of an object detection post-processing device according to one or more example embodiments.

FIG. 6 is a flowchart illustrating an operation of an object detection post-processing device according to one or more example embodiments, and FIG. 7 is a diagram illustrating a portion of the image of FIG. 3A for an example of an operation of an object detection post-processing device according to one or more example embodiments.

Referring to FIGS. 1 and 6, a position information storing unit (e.g., a position information storage device) 130 of an object detection post-processing device 100 may accumulatively store position information PPI of a plurality of previous frames (S510), and an input unit (e.g., an input or an input circuit) 110 of the object detection post-processing device 100 may receive the position information CPI of a current frame from an object detection device (S520). An accumulated position calculating unit (e.g., an accumulated position calculator or an accumulated position calculating circuit) 150 of the object detection post-processing device 100 may determine a median object detection region of a current object detection region represented by the position information CPI of the current frame and a plurality of previous object detection regions represented by the position information PPI of the plurality of previous frames (S530 through S560), and may generate accumulated position information API representing the median object detection region (S570).

For example, as illustrated in FIG. 7, the accumulated position calculating unit 150 may calculate a median horizontal start position MHS by calculating a median value of a current horizontal start position HS1 of the current object detection region CODR and a plurality of previous horizontal start positions HS2, HS3, HS4, and HS5 of the plurality of previous object detection regions PODR1, PODR2, PODR3, and PODR4 (S530). The accumulated position calculating unit 150 may calculate a median horizontal end position MHE by calculating a median value of a current horizontal end position HE1 of the current object detection region CODR and a plurality of previous horizontal end positions HE2, HE3, HE4, and HE5 of the plurality of previous object detection regions PODR1, PODR2, PODR3, and PODR4 (S540). The accumulated position calculating unit 150 may calculate a median vertical start position MVS by calculating a median value of a current vertical start position VS1 of the current object detection region CODR and a plurality of previous vertical start positions VS2, VS3, VS4, and VS5 of the plurality of previous object detection regions PODR1, PODR2, PODR3, and PODR4 (S550). The accumulated position calculating unit 150 may calculate a median vertical end position MVE by calculating a median value of a current vertical end position VE1 of the current object detection region CODR and a plurality of previous vertical end positions VE2, VE3, VE4, and VE5 of the plurality of previous object detection regions PODR1, PODR2, PODR3, and PODR4 (S560). Further, the accumulated position calculating unit 150 may generate the accumulated position information API including the median horizontal start position MHS, the median horizontal end position MHE, the median vertical start position MVS, and the median vertical end position MVE (S570). A position information deciding unit (e.g., a position information determiner or a position information deciding circuit) 170 of the object detection post-processing device 100 may output the accumulated position information API including the median horizontal start position MHS, the median horizontal end position MHE, the median vertical start position MVS, and the median vertical end position MVE as final position information FPI (S580). Accordingly, the object detection post-processing device 100 according to one or more example embodiments may output the stable and accurate accumulated position information API as the final position information FPI.

Figure 8:
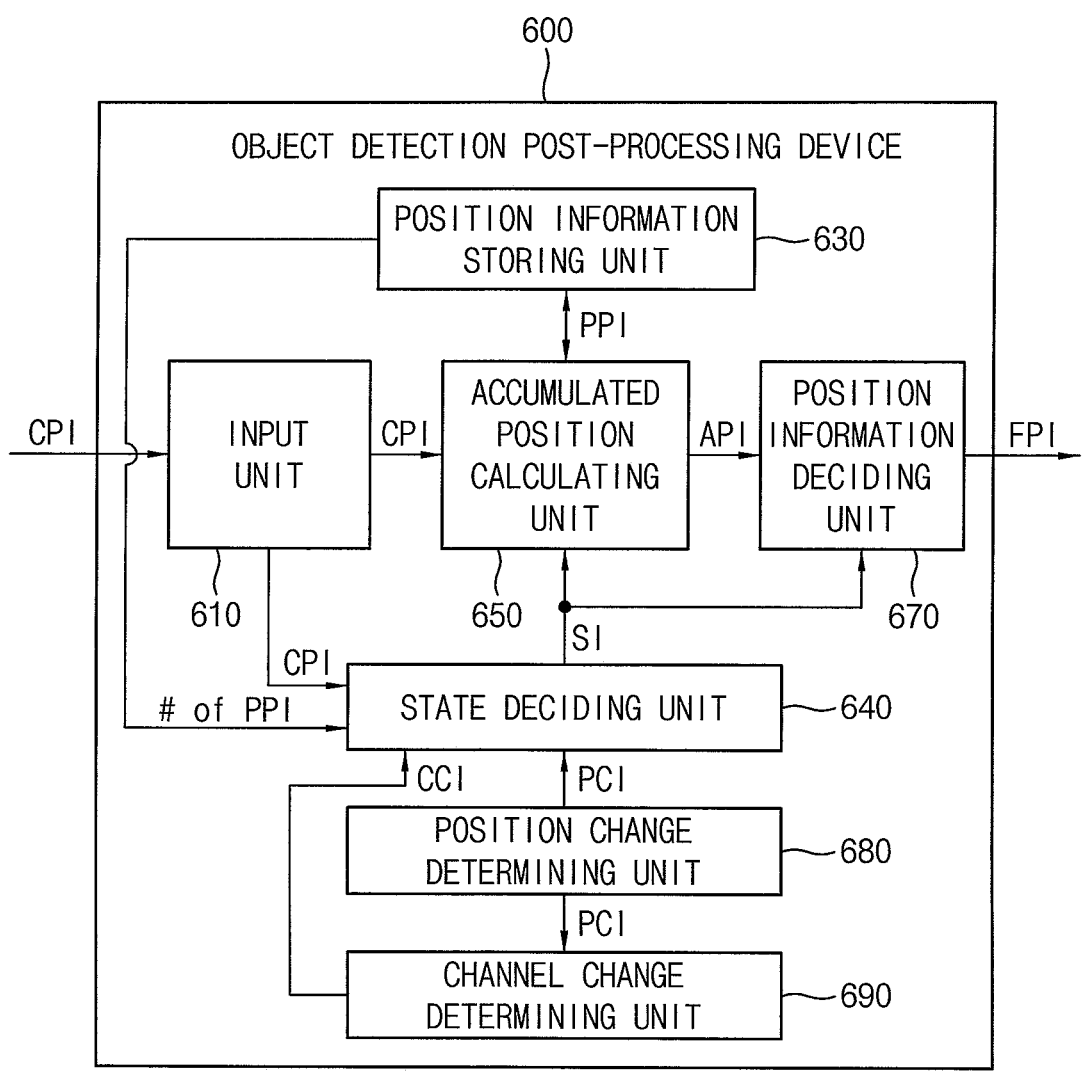
FIG. 8 is a block diagram illustrating an object detection post-processing device according to one or more example embodiments.
Figure 10:
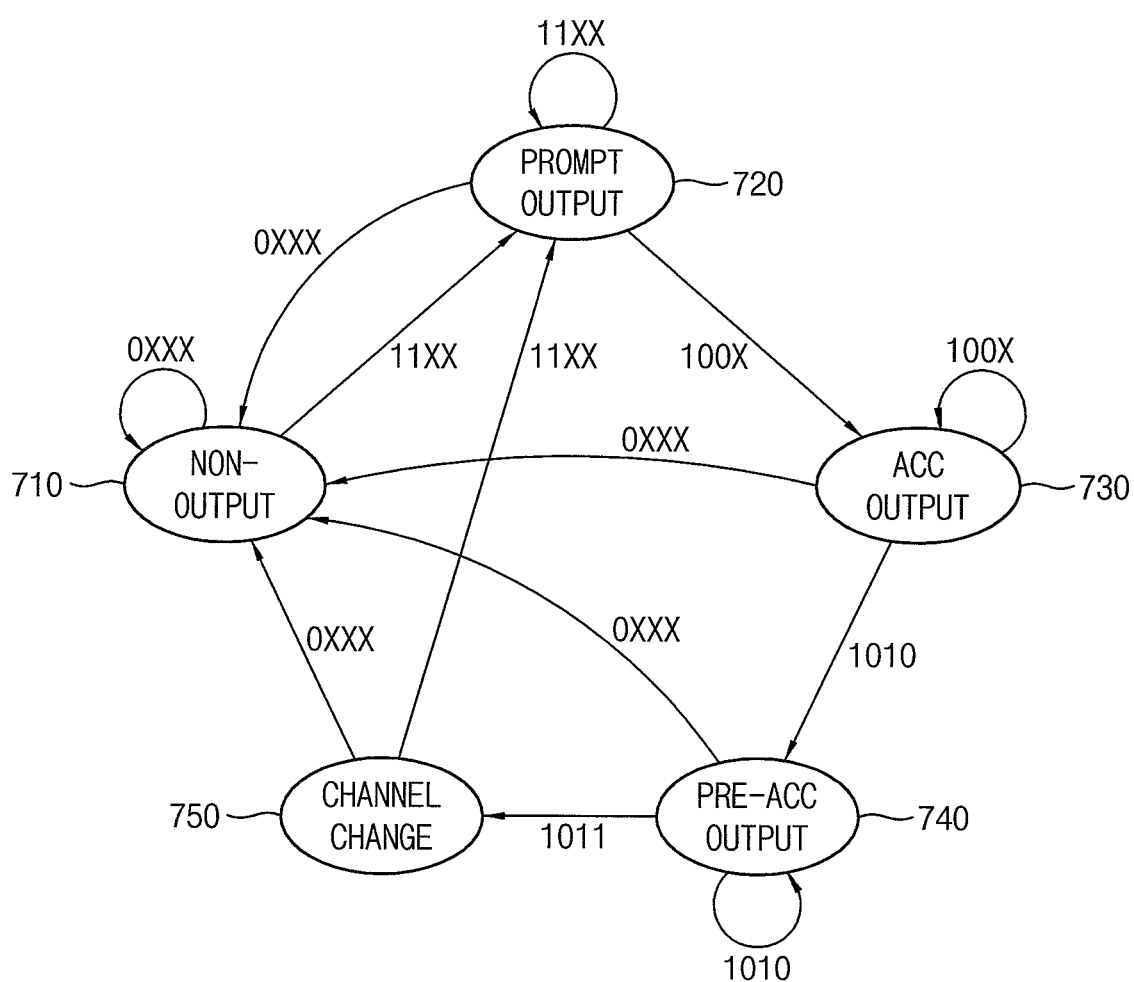
FIG. 10 is a state diagram illustrating examples of operating stages determined by a state deciding unit illustrated in FIG. 8.

FIG. 8 is a block diagram illustrating an object detection post-processing device according to one or more example embodiments, FIG. 9 is a diagram illustrating examples of operating stages determined by a state deciding unit (e.g., a state determiner or a state deciding circuit) illustrated in FIG. 8, and FIG. 10 is a state diagram illustrating examples of operating stages determined by a state deciding unit (e.g., a state determiner or a state deciding circuit) illustrated in FIG. 8.

Referring to FIG. 8, an object detection post-processing device 600 in a display device may include an input unit (e.g., an input or an input circuit) 610, a position information storing unit (e.g., a position information storage device) 630, a state deciding unit (e.g., a state determiner or a state deciding circuit) 640, an accumulated position calculating unit (e.g., an accumulated position calculator or an accumulated position calculating circuit) 650, and a position information deciding unit (e.g., a position information determiner or a position information deciding circuit) 670. In some example embodiments, the object detection post-processing device 600 may further include a position change determining unit (e.g., a position change determiner or a position change determining circuit) 680 and a channel change determining unit (e.g., a channel change determiner or a channel change determining circuit) 690. Compared with the object detection post-processing device 100 of FIG. 1, the object detection post-processing device 600 of FIG. 8 may further include the state deciding unit 640, the position change determining unit 680, and the channel change determining unit 690.

The input unit 610 may receive position information CPI of an object that is detected from input image data for the display device for a current frame. The position information storing unit 630 may accumulatively store the position information PPI of a plurality of previous frames.

The state deciding unit 640 may determine an operating state of the object detection post-processing device 600. In some example embodiments, as illustrated in FIGS. 9 and 10, the state deciding unit 640 may generate state information SI representing one of a non-output state 710, a prompt output state 720, an accumulated output state 730, a previous accumulated output state 740, and a channel change state 750 as the operating state of the object detection post-processing device 600.

The accumulated position calculating unit 650 may generate accumulated position information API according to (e.g., based on) the position information CPI of the current frame and the position information PPI of the plurality of previous frames in a case where the state information SI represents the accumulated output state 730, and may generate the accumulated position information SPI according to (e.g., based on) the position information PPI of the plurality of previous frames in a case where the state information SI represents the previous accumulated output state 740.

The position information deciding unit 670 may determine final position information FPI according to (e.g., based on) the state information SI and the accumulated position information API, and may output the final position information FPI.

In the object detection post-processing device 600, the state deciding unit 640 may determine the non-output state 710 as the operating state in a case where the position information CPI of the current frame represents that no object is detected (e.g., OBJECT DETECTED=0). In some example embodiments, in a case where the position information CPI represents that no object is detected (e.g., OBJECT DETECTED=0) in any previous states 710 through 750, the state deciding unit 640 may generate the state information SI representing the non-output state 710. The position information deciding unit 670 may determine the position information CPI of the current frame representing that no object is detected as the final position information FPI in response to the state information SI representing the non-output state 710.

The state deciding unit 640 may determine the prompt output state 720 as the operating state in a case where the object is detected or the detected object exists (e.g., OBJECT DETECTED=1), and the position information storing unit 630 stores the position information PPI of the previous frames of which the number is less than a first reference number. In other words, in a case (e.g., "#OF PPI<FIRST NUMBER"=1) where the number (e.g., #OF PPI) of the previous position information PPI stored in the position information storing unit 630 is less than the first reference number (e.g., FIRST NUMBER), the state deciding unit 640 may generate the state information SI representing the prompt output state 720. For example, in an embodiment, the first reference number (e.g., FIRST NUMBER) may be 32 (or about 32), but the present disclosure is not limited thereto. The position information deciding unit 670 may determine the position information CPI of the current frame as the final position information FPI in response to the state information SI representing the prompt output state 720.

The state deciding unit 640 may determine the accumulated output state 730 as the operating state in a case where the object is detected or the detected object exists (e.g., OBJECT DETECTED=1), and the position information storing unit 630 may store the position information PPI of the previous frames of which the number is greater than or equal to the first reference number (e.g., "#OF PPI<FIRST NUMBER"=0). The accumulated position calculating unit 650 may generate the accumulated position information API according to (e.g., based on) the position information CPI of the current frame and the position information PPI of the plurality of previous frames in response to the state information SI representing the accumulated output state 730, and the position information deciding unit 670 may determine the accumulated position information API generated according to (e.g., based on) the position information CPI of the current frame and the position information PPI of the plurality of previous frames as the final position information FPI in response to the state information SI representing the accumulated output state 730.

The position change determining unit 680 may compare a difference between a current object detection region represented by the position information CPI of the current frame and a previous object detection region represented by the position information PPI of at least one of the previous frames with a reference position difference. For example, the position change determining unit 680 may compare a difference between the current object detection region represented by the position information CPI of the current frame and an immediately previous object detection region represented by the position information PPI of an immediately previous frame with the reference position difference. Further, the position change determining unit 680 may determine that an object detection region of the detected object is changed in a case where the difference between the current object detection region and the previous object detection region is greater than or equal to the reference position difference. The reference position difference may be variously modified according to example embodiments. The position change determining unit 680 may provide position change information PCI representing that the object detection region of the detected object is changed to the state deciding unit 640 and the channel change determining unit 690.

The channel change determining unit 690 may determine that an image channel is changed in a case where the object detection region of the detected object is determined to be changed in one frame, and the changed object detection region of the detected object is constant or substantially constant during a second reference number of subsequent frames. For example, in an embodiment, the second reference number may be 4 (or about 4), but the present disclosure is not limited thereto. Here, the phrase "the image channel is changed" may refer to a case where an image source that provides input image data is changed. The channel change determining unit 690 may provide channel change information CCI representing that the image channel is changed to the state deciding unit 640.

The state deciding unit 640 may determine the previous accumulated output state 740 as the operating state in a case where the object is detected or the detected object exists (e.g., OBJECT DETECTED=1), the position information storing unit 630 stores the position information PPI of the previous frames of which the number is greater than or equal to the first reference number (e.g., "#OF PPI<FIRST NUMBER"=0), the object detection region of the detected object is determined to be changed (e.g., POSITION CHANGE=1), and the changed object detection region of the detected object is not constant during the second reference number of frames (e.g., CHANNEL CHANGE=0). The accumulated position calculating unit 650 may generate the accumulated position information API according to (e.g., based on) the position information PPI of the plurality of previous frames in response to the state information SI representing the previous accumulated output state 740, and the position information deciding unit 670 may determine the accumulated position information API generated according to (e.g., based on) the position information PPI of the plurality of previous frames as the final position information FPI in response to the state information SI representing the previous accumulated output state 740.

The state deciding unit 640 may determine the channel change state 750 as the operating state in a case where the object is detected or the detected object exists (e.g., OBJECT DETECTED=1), the position information storing unit 630 stores the position information PPI of the previous frames of which the number is greater than or equal to the first reference number (e.g., "#OF PPI<FIRST NUMBER"=0), the object detection region of the detected object is determined to be changed (e.g., POSITION CHANGE=1), and the changed object detection region of the detected object is constant or substantially constant during the second reference number of frames (e.g., CHANNEL CHANGE=1). In response to the state information SI representing the channel change state 750, the position information deciding unit 670 may reset the position information storing unit 630 such that the position information PPI of the plurality of previous frames stored in the position information storing unit 630 is deleted, and may determine the position information CPI of the current frame as the final position information FPI. In at least one subsequent frame, because no previous position information PPI is stored in the position information storing unit 630, the prompt output state 720 may be determined as the operating state.

As described above with reference to one or more example embodiments, the object detection post-processing device 600 according to one or more example embodiments may accumulatively store the position information PPI of the plurality of previous frames, may generate the accumulated position information API according to (e.g., based on) the position information CPI of the current frame and/or the position information PPI of the plurality of previous frames, and may output the accumulated position information API as the final position information FPI (e.g., in the accumulated output state 730 or the previous accumulated output state 740). Accordingly, even if the position information CPI received from the object detection device fluctuates or has the variation (e.g., the deviation), the object detection post-processing device 600 according to one or more example embodiments may output the stable and accurate final position information FPI. Further, the object detection post-processing device 600 according to one or more example embodiments may determine one of the non-output state 710, the prompt output state 720, the accumulated output state 730, the previous accumulated output state 740, and the channel change state 750 as the operating state, and may output the final position information FPI suitable for various states or situations.

Figure 11B:
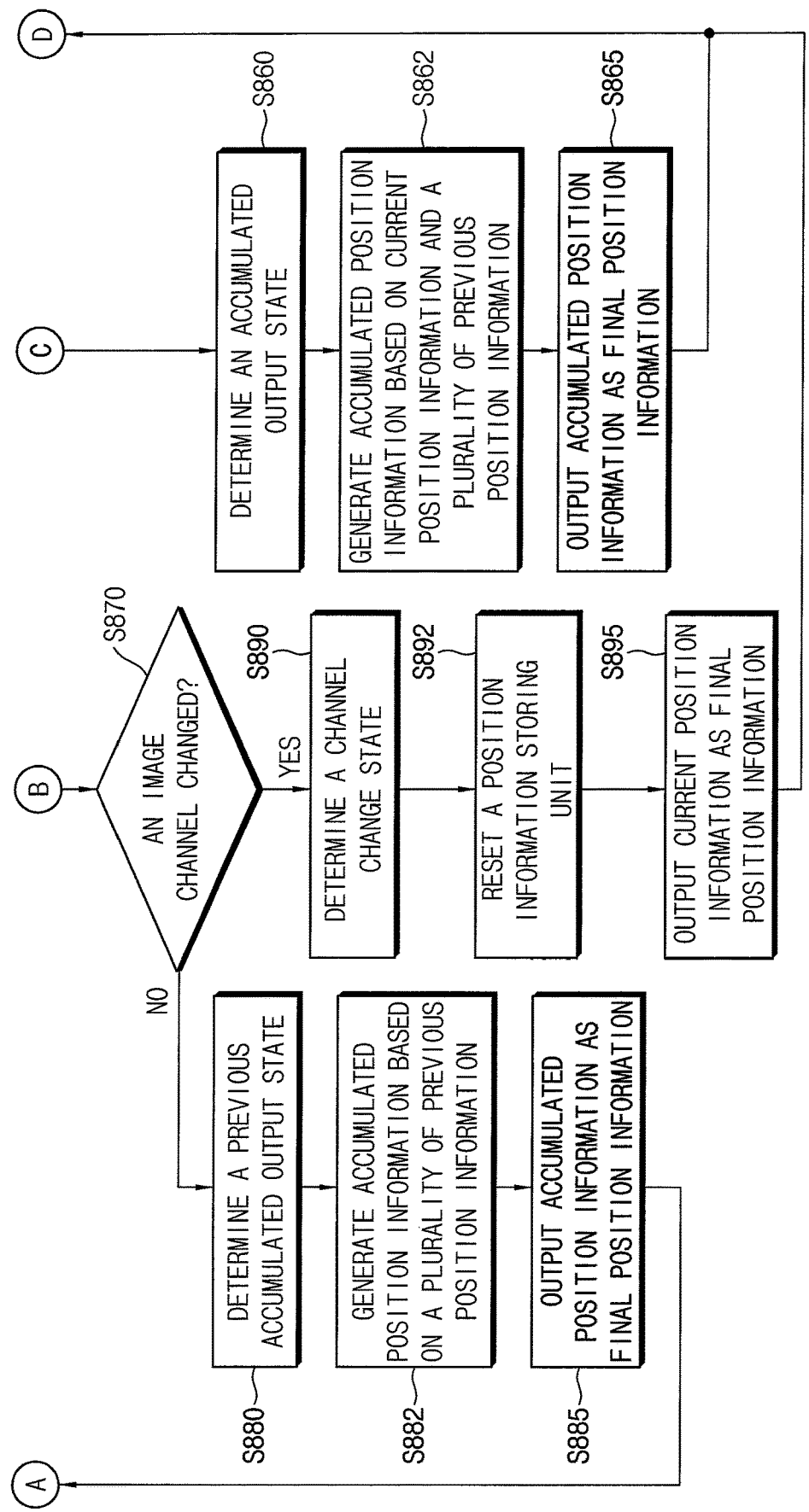
Figure 12:
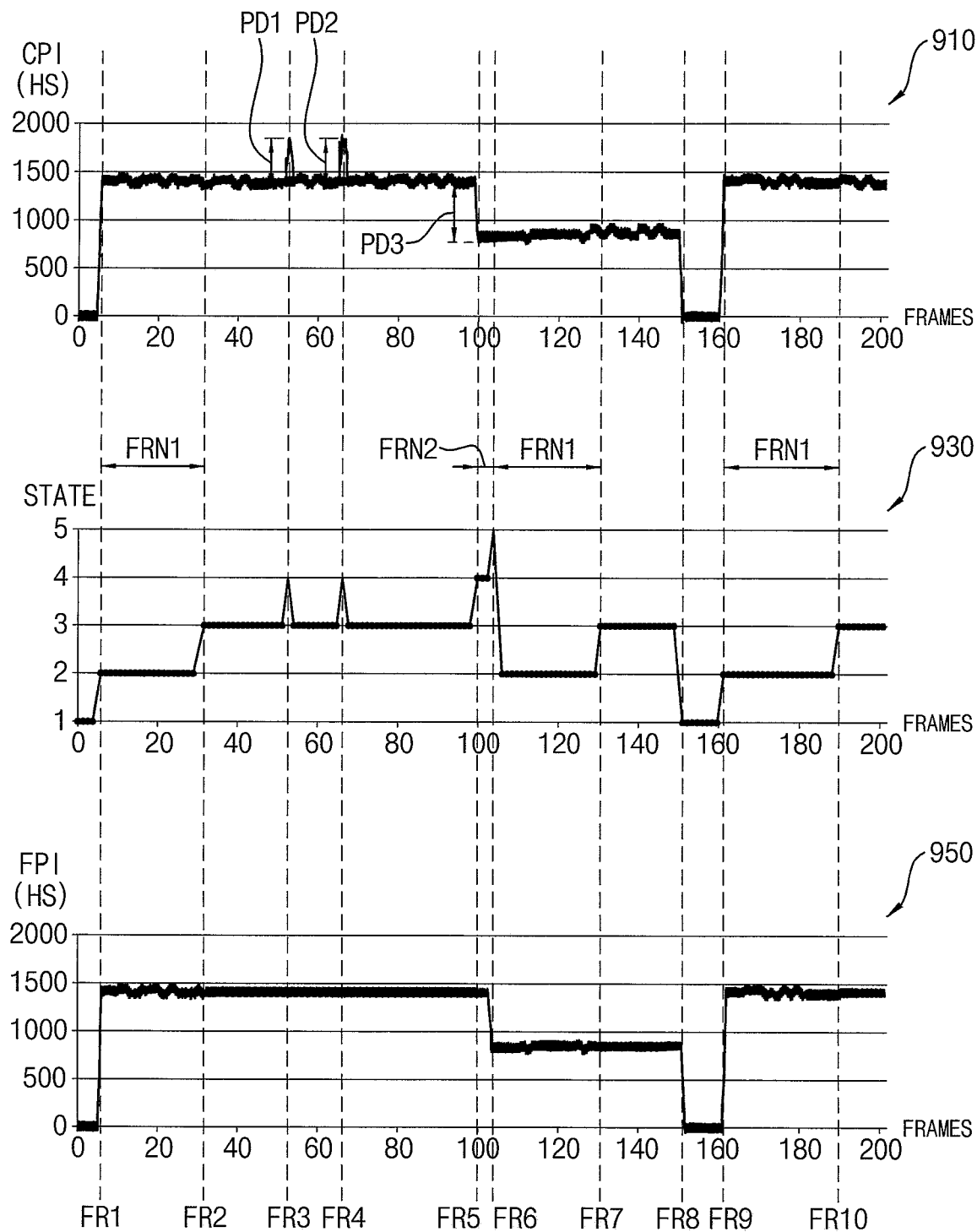
FIG. 12 is a diagram illustrating an example of an operation of an object detection post-processing device according to one or more example embodiments.

FIGS. 11A and 11B are flowcharts illustrating operations of an object detection post-processing device according to one or more example embodiments, and FIG. 12 is a diagram illustrating an example of an operation of an object detection post-processing device according to one or more example embodiments.

Referring to FIGS. 8, 11A, and 11B, an object detection post-processing device 600 may receive position information CPI of a current frame (S800). In a case where the position information CPI of the current frame represents that no object is detected (S810: NO), a state deciding unit (e.g., a state determiner or a state deciding circuit) 640 may determine a non-output state as an operating state of the object detection post-processing device 600 (S820), and a position information deciding unit (e.g., a position information determiner or a position information deciding circuit) 670 may output the position information CPI of the current frame representing that no object is detected as final position information FPI in response to state information SI representing the non-output state (S825). Referring to FIG. 12, 910 represents input position information CPI, for example, horizontal start positions HS of the input position information CPI, according to frames FRAMES, 930 represents operating states STATE determined by the state deciding unit 640 according to the frames FRAMES, and 950 represents the final position information FPI, for example, horizontal start positions HS of the final position information FPI, according to frames FRAMES. Further, in FIG. 12, the operating state STATE having a value of 1 may refer to (e.g., may be) the non-output state, the operating state STATE having a value of 2 may refer to (e.g., may be) a prompt output state, the operating state STATE having a value of 3 may refer to (e.g., may be) an accumulated output state, the operating state STATE having a value of 4 may refer to (e.g., may be) a previous accumulated output state, and the operating state STATE having a value of 5 may refer to (e.g., may be) a channel change state. In the example of FIG. 12, in frames prior to (e.g., before) a first frame FR1 where the position information CPI of the current frame represents that no object is detected, the state deciding unit 640 may determine the non-output state as the operating state, and the position information deciding unit 670 may output the final position information FPI representing that no object is detected.

In a case where an object is detected or the detected object exists (S810: YES), and a position information storing unit (e.g., a position information storage device) 630 stores position information PPI of previous frames of which the number is less than a first reference number (S830: YES), the state deciding unit 640 may determine the prompt output state as the operating state (S840), and the position information deciding unit 670 may output the position information CPI of the current frame as the final position information FPI in response to the state information SI representing the prompt output state (S845). In the example of FIG. 12, during the first reference number of frames FRN1 from the first frame FR1, the state deciding unit 640 may determine the prompt output state as the operating state, and the position information deciding unit 670 may output the position information CPI of the current frame as the final position information FPI. After the first reference number of frames FRN1, the position information storing unit 630 may store the position information PPI of the first reference number of previous frames.

In a case where the detected object exists (S810: YES), the position information storing unit 630 stores the position information PPI of the previous frames of which the number is greater than or equal to the first reference number (S830: NO), and an object detection region of the detected object is determined not to be changed (S850: NO), the state deciding unit 640 may determine the accumulated output state as the operating state (S860), an accumulated position calculating unit (e.g., an accumulated position calculator or an accumulated position calculating circuit) 650 may generate accumulated position information API according to (e.g., based on) the position information CPI of the current frame and the position information PPI of the plurality of previous frames in response to the state information SI representing the accumulated output state (S862), and the position information deciding unit 670 may output the accumulated position information API generated according to (e.g., based on) the position information CPI of the current frame and the position information PPI of the plurality of previous frames as the final position information FPI in response to the state information SI representing the accumulated output state (S865). In the example of FIG. 12, in frames from a second frame FR2 to before a fifth frame FR5, except for third and fourth frames FR3 and FR4 where a position change is detected, the state deciding unit 640 may determine the accumulated output state as the operating state, and the position information deciding unit 670 may output the accumulated position information API generated according to (e.g., based on) the position information CPI of the current frame and the position information PPI of the plurality of previous frames as the final position information FPI. Accordingly, even if the input position information 910 according to frames FRAMES fluctuates or has the variation (e.g., the deviation), the object detection post-processing device 600 according to one or more example embodiments may output the stable and accurate final position information 950.

In a case where the object is detected or the detected object exists (S810: YES), the position information storing unit 630 stores the position information PPI of the previous frames of which the number is greater than or equal to the first reference number (S830: NO), the object detection region of the detected object is determined to be changed (S850: YES), and the changed object detection region of the detected object is not constant during a second reference number (e.g., 4) of frames, or an image channel is not changed (S870: NO), the state deciding unit 640 may determine the previous accumulated output state as the operating state (S880), the accumulated position calculating unit 650 may generate the accumulated position information API according to (e.g., based on) the position information PPI of the plurality of previous frames in response to the state information SI representing the previous accumulated output state (S882), and the position information deciding unit 670 may output the accumulated position information API generated according to (e.g., based on) the position information PPI of the plurality of previous frames as the final position information FPI in response to the state information SI representing the previous accumulated output state (S885). In the example of FIG. 12, in each of the third and fourth frames FR3 and FR4, the position change determining unit 680 may determine that the object detection region of the detected object is changed in a case where a difference PD1 and PD2 between a current object detection region represented by the position information CPI of the current frame and an immediately previous object detection region represented by the position information PPI of an immediately previous frame is greater than or equal to a reference position difference, the state deciding unit 640 may determine the previous accumulated output state as the operating state, the accumulated position calculating unit 650 may generate the accumulated position information API according to (e.g., based on) only the position information PPI of the plurality of previous frames by excluding the position information CPI of the current frame, and the position information deciding unit 670 may output the accumulated position information API generated according to (e.g., based on) the position information PPI of the plurality of previous frames as the final position information FPI. Accordingly, even if erroneously detected position information 930 is received during each of the third and fourth frames FR3 and FR4, the object detection post-processing device 600 according to one or more example embodiments may output the stable and accurate final position information 950.

In a case where the object is detected or the detected object exists (S810: YES), the position information storing unit 630 stores the position information PPI of the previous frames of which the number is greater than or equal to the first reference number (S830: NO), the object detection region of the detected object is determined to be changed (S850: YES), and the changed object detection region of the detected object is constant or substantially constant during the second reference number of frames, or the image channel is changed (S870: YES), the state deciding unit 640 may determine the channel change state as the operating state (S890). In response to the state information SI representing the channel change state, the position information deciding unit 670 may reset the position information storing unit 630 such that the position information PPI of the plurality of previous frames stored in the position information storing unit 630 is deleted (S892), and may output the position information CPI of the current frame as the final position information FPI (S985). In the example of FIG. 12, in the fifth frame FR5, the position change determining unit 680 may determine that the object detection region of the detected object is changed in a case where a difference PD3 between a current object detection region represented by the position information CPI of the current frame and an immediately previous object detection region represented by the position information PPI of an immediately previous frame is greater than or equal to the reference position difference, and the state deciding unit 640 may determine the previous accumulated output state as the operating state. Further, during the second reference number of frames FRN2 from the fifth frame FR5, the state deciding unit 640 may determine the previous accumulated output state as the operating state. In a case where the changed object detection region of the detected object is constant or substantially constant during the second reference number of frames FRN2, the channel change determining unit 690 may determine that the image channel is changed. In a sixth frame FR6 after the second reference number of frames FRN2 from the fifth frame FR5, the state deciding unit 640 may determine the channel change state as the operating state, and the position information deciding unit 670 may reset the position information storing unit 630, and may output the position information CPI of the current frame as the final position information FPI. Thereafter, during the first reference number of frames FRN1, the state deciding unit 640 may determine the prompt output state as the operating state. In frames from a seventh frame FR7 to before an eighth frame FR8, the state deciding unit 640 may determine the accumulated output state as the operating state. In frames from the eighth frame FR8 to before a ninth frame FR9, in a case where no object is detected, the state deciding unit 640 may determine the non-output state as the operating state. In frames from the ninth frame FR9 to before a tenth frame FR10, the state deciding unit 640 may determine the prompt output state as the operating state. In subsequent frames from the tenth frame FR10, the state deciding unit 640 may determine the accumulated output state as the operating state.

As described above, the object detection post-processing device 600 according to one or more example embodiments may determine one of the non-output state, the prompt output state, the accumulated output state, the previous accumulated output state, and the channel change state as the operating state, and may output the final position information FPI suitable for various states or situations.

Figure 13:
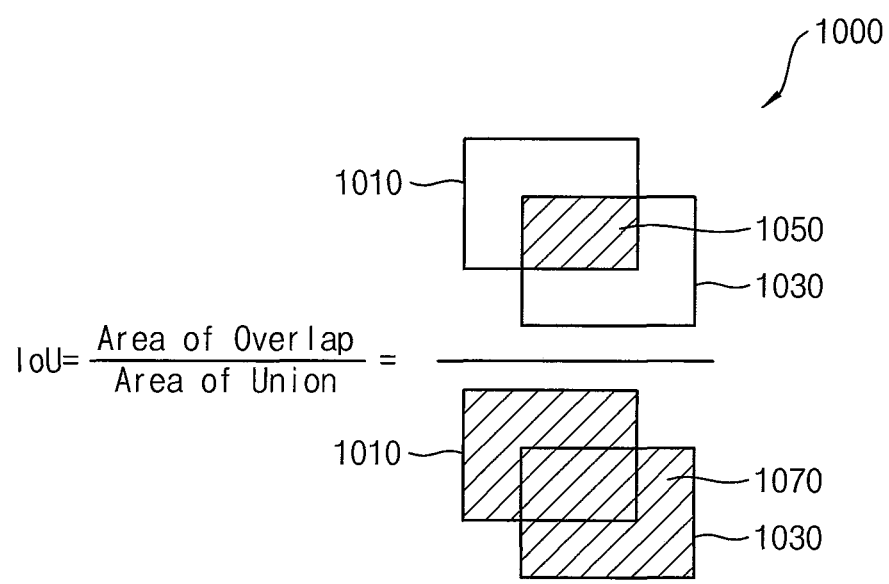
FIG. 13 is a diagram illustrating position accuracy that is improved by an object detection post-processing device according to one or more example embodiments.

FIG. 13 is a diagram illustrating position accuracy that is improved by an object detection post-processing device according to one or more example embodiments.

FIG. 13 illustrates an equation 1000 of an intersection over union (IoU) representing position accuracy of an object detection device. The IoU may be calculated according to (e.g., by) an area of overlap 1050 of a detection region 1010 and a correct region 1030 divided by an area of union 1070 of the detection region 1010 and the correct region 1030. Because the object detection post-processing device 100 of FIG. 1 or the object detection post-processing device 600 of FIG. 6 may be applied after the object detection device, stable and accurate final position information may be output, and the IoU may be increased.

Figure 14:
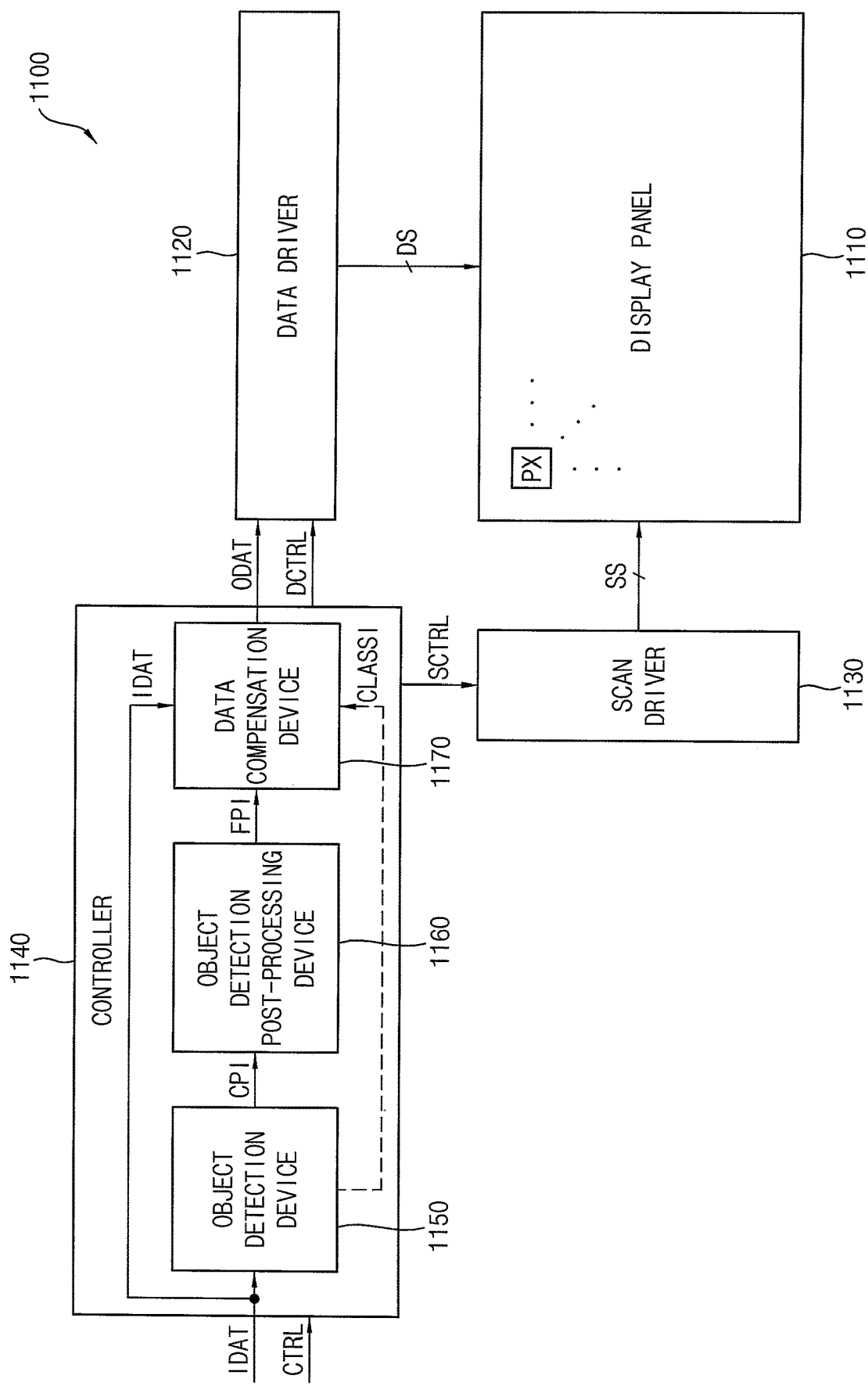
FIG. 14 is a block diagram illustrating a display device including an object detection post-processing device according to one or more example embodiments.

FIG. 14 is a block diagram illustrating a display device including an object detection post-processing device according to one or more example embodiments.

Referring to FIG. 14, a display device 1100 according to one or more example embodiments may include a display panel 1110 including a plurality of pixels PX, a data driver 1120 that provides data signals DS to the plurality of pixels PX, a scan driver 1130 that provides scan signals SS to the plurality of pixels PX, and a controller 1140 that controls the data driver 1120 and the scan driver 1130.

The display panel 1110 may include a plurality of data lines, a plurality of scan lines, and the plurality of pixels PX coupled to the plurality of data lines and the plurality of scan lines. In some example embodiments, each pixel PX may include at least one capacitor, at least two transistors, and an organic light emitting diode (OLED), and the display panel 1110 may be an OLED display panel. In other example embodiments, the display panel 1110 may be a liquid crystal display (LCD) panel, or any other suitable display panel as would be known to those having ordinary skill in the art.

The data driver 1120 may generate the data signals DS according to (e.g., based on) a data control signal DCTRL and output image data ODAT received from the controller 1140, and may provide the data signals DS corresponding to the output image data ODAT to the plurality of pixels PX through the plurality of data lines. In some example embodiments, the data control signal DCTRL may include, for example, an output data enable signal, a horizontal start signal, a load signal, and/or the like, but the present disclosure is not limited thereto. In some example embodiments, the data driver 1120 and the controller 1140 may be implemented as a single integrated circuit, and the single integrated circuit may be referred to as a timing controller embedded data driver (TED). In other example embodiments, the data driver 1120 and the controller 1140 may be implemented with separate integrated circuits.

The scan driver 1130 may generate the scan signals SS according to (e.g., based on) a scan control signal SCTRL received from the controller 1140, and may provide the scan signals SS to the plurality of pixels PX through the plurality of scan lines. In some example embodiments, the scan driver 1130 may sequentially provide the scan signals SS to the plurality of pixels PX on a row-by-row basis. In some example embodiments, the scan control signal SCTRL may include, for example, a scan start signal, a scan clock signal, and/or the like, but the present disclosure is not limited thereto. In some example embodiments, the scan driver 1130 may be integrated or formed at (e.g., in or on) a peripheral portion of the display panel 1110. In other example embodiments, the scan driver 1130 may be implemented with one or more integrated circuits.

The controller (e.g., a timing controller (TCON)) 1140 may receive input image data IDAT and a control signal CTRL from an external host processor (e.g., a graphics processing unit (GPU) or a graphics card). In some example embodiments, the control signal CTRL may include, for example, a vertical synchronization signal, a horizontal synchronization signal, an input data enable signal, a master clock signal, and/or the like, but the present disclosure is not limited thereto. The controller 1140 may generate the output image data ODAT, the data control signal DCTRL, and the scan control signal SCTRL according to (e.g., based on) the image data IDAT and the control signal CTRL. The controller 1140 may control the data driver 1120 by providing the output image data ODAT and the data control signal DCTRL to the data driver 1120, and may control the scan driver 1130 by providing the scan control signal SCTRL to the scan driver 1130.

The controller 1140 of the display device 1100 according to one or more example embodiments may include an object detection device 1150, an object detection post-processing device 1160, and a data compensation device 1170.

The object detection device 1150 may detect an object from the input image data IDAT, and may generate position information CPI of the detected object. In some example embodiments, the object detection device 1150 may detect the object from the input image data IDAT by using an artificial intelligence (AI) technique, and may generate the position information CPI and/or classification information CLASSI of the detected object. For example, the object detection device 1150 may detect the object by using deep learning convolutional neural networks (CNNs) or recurrent neural networks (RNNs). For example, the object detected by the object detection device 1150 may be any suitable object, such as a face, a product, a logo, a high dynamic range object, and/or the like. Although FIG. 14 illustrates an example where the object detection device 1150 is included in the display device 1100, in some example embodiments, the object detection device 1150 may be included in the external host processor. In this case, the object detection post-processing device 1160 may receive the position information CPI and/or the classification information CLASSI from the external host processor.

The object detection post-processing device 1160 may determine final position information FPI according to (e.g., based on) the position information CPI of the detected object received from the object detection device 1150. In some example embodiments, the object detection post-processing device 1160 may accumulatively store the position information of a plurality of previous frames, and may receive the position information CPI of a current frame. The object detection post-processing device 1160 may generate accumulated position information according to (e.g., based on) the position information CPI of the current frame and the position information of the plurality of previous frames, and may output the accumulated position information as the final position information FPI. Accordingly, even if the position information CPI received from the object detection device 1150 fluctuates or has the variation (e.g., the deviation), the object detection post-processing device 1160 may output the stable and accurate final position information FPI.

The data compensation device 1170 may generate the output image data ODAT by compensating for the input image data IDAT according to (e.g., based on) the final position information FPI and/or the classification information CLASSI. For example, in a case where the detected object is the face, the data compensation device 1170 may generate the output image data ODAT by performing a skin color enhancement process on the input image data IDAT. In another example, in a case where the detected object is the logo, the data compensation device 1170 may generate the output image data ODAT by performing a shift process or a degradation compensation process on the input image data IDAT. In still another example, in a case where the detected object is the high dynamic range object, for example, such as a sun, the data compensation device 1170 may generate the output image data ODAT by performing a process that makes a bright object to be brighter and a dark object to be darker on the input image data IDAT. However, the compensation process performed by the data compensation device 1170 may not be limited to the examples described above.

As described above, the display device 1100 according to one or more example embodiments may include the object detection post-processing device 1160 that accumulatively stores the position information of the plurality of previous frames, generates the accumulated position information according to (e.g., based on) the position information CPI of the current frame and the position information of the plurality of previous frames, and outputs the accumulated position information as the final position information FPI. Accordingly, even if the position information CPI generated by the object detection device 1150 fluctuates or has the variation (e.g., the deviation), the stable and accurate final position information FPI may be generated.

Figure 15:
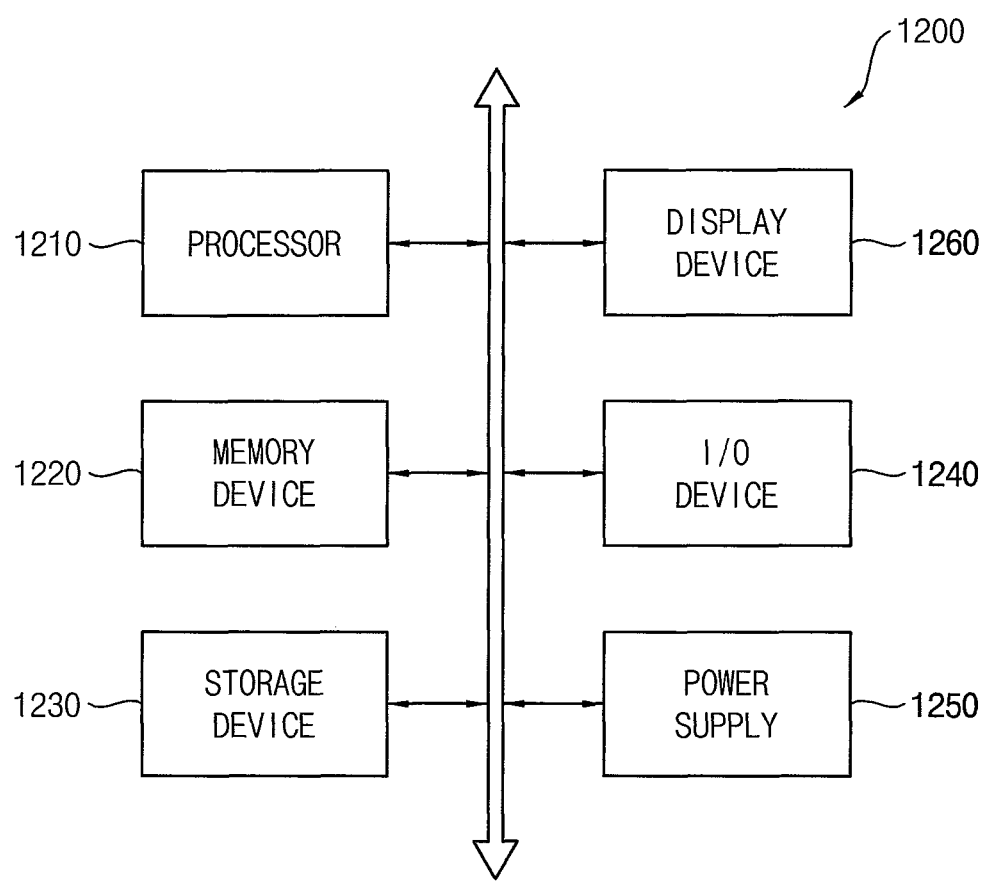
FIG. 15 is a block diagram illustrating a communication system according to one or more example embodiments.

FIG. 15 is a block diagram illustrating a communication system according to one or more example embodiments.

Referring to FIG. 15, an electronic device 1200 may include a processor 1210, a memory device 1220, a storage device 1230, an input/output (I/O) device 1240, a power supply 1250, and a display device 1260. The electronic device 1200 may further include a plurality of ports for communicating with a video card, a sound card, a memory card, a universal serial bus (USB) device, other electric devices, and/or the like.

The processor 1210 may perform various computing functions or tasks. The processor 1210 may be an application processor (AP), a microprocessor, a central processing unit (CPU), and/or the like. The processor 1210 may be coupled to other components via an address bus, a control bus, a data bus, and/or the like. Further, in some example embodiments, the processor 1210 may be further coupled to an extended bus such as a peripheral component interconnection (PCI) bus.

The memory device 1220 may store data for operations of the electronic device 1200. For example, the memory device 1220 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and/or the like, and/or at least one volatile memory device such as a dynamic random access memory (DRAM) device, a static random access memory (SRAM) device, a mobile dynamic random access memory (mobile DRAM) device, and/or the like.

The storage device 1230 may be a solid state drive (SSD) device, a hard disk drive (HDD) device, a CD-ROM device, and/or the like. The I/O device 1240 may be an input device such as a keyboard, a keypad, a mouse, a touch screen, and/or the like, and an output device such as a printer, a speaker, and/or the like. The power supply 1250 may supply power for operations of the electronic device 1200. The display device 1260 may be coupled to other components through the buses or other communication links.

The display device 1100 may include an object detection post-processing device that generates accumulated position information according to (e.g., based on) position information of a plurality of frames, and outputs the accumulated position information as final position information. Accordingly, even if input position information fluctuates in each frame or has a variation (e.g., a deviation), stable and accurate position information may be generated.

The aspects and features of one or more example embodiments of the present disclosure may be applied to any suitable display device 1260, and/or any suitable electronic device 1200 including the display device 1260. For example, the aspects and features of one or more example embodiments of the present disclosure may be applied to a mobile phone, a smart phone, a tablet computer, a television (TV), a digital TV, a 3D TV, a wearable electronic device, a personal computer (PC), a home appliance, a laptop computer, a personal digital assistant (PDA), a portable multimedia player (PMP), a digital camera, a music player, a portable game console, a navigation device, and/or the like.

The foregoing is illustrative of some example embodiments and is not to be construed as limiting thereof. Although some example embodiments have been described, those skilled in the art will readily appreciate that various modifications are possible in the example embodiments without departing from the spirit and scope of the present disclosure. Therefore, it is to be understood that the foregoing is illustrative of various example embodiments and is not to be construed as limited to the specific example embodiments disclosed herein, and that various modifications to the disclosed example embodiments, as well as to other example embodiments, are intended to be included within the spirit and scope of the present disclosure. Accordingly, all such modifications are intended to be included within the spirit and scope of the present disclosure, as defined in the appended claims, and their equivalents.

What is claimed is:

1. An object detection post-processing device of a display device, the object detection post-processing device comprising:
    an input configured to receive position information of an object that is detected from input image data for the display device in a current frame from among a plurality of sequential frames;
    a position information storage device configured to accumulatively store the position information of a plurality of previous frames from among the plurality of sequential frames;
    an accumulated position calculator configured to generate accumulated position information according to the position information of the current frame and the position information of the plurality of previous frames;
    a state determiner configured to generate state information representing one of a non-output state, a prompt output state, an accumulated output state, a previous accumulated output state, and a channel change state as an operating state of the object detection post-processing device; and
    a position information determiner configured to determine final position information according to the accumulated position information, and to output the final position information,
    wherein the final position information is determined based on the state information and the accumulated position information.

2. The object detection post-processing device of claim 1, wherein the position information represents a rectangular object detection region for the detected object.

3. The object detection post-processing device of claim 2, wherein the accumulated position calculator is configured to determine an overlapping region where a current object detection region represented by the position information of the current frame and a plurality of previous object detection regions represented by the position information of the plurality of previous frames overlap with each other, and to generate the accumulated position information representing the overlapping region.

4. The object detection post-processing device of claim 1, wherein the position information comprises a horizontal start position, a horizontal end position, a vertical start position, and a vertical end position to represent a rectangular object detection region for the detected object.

5. The object detection post-processing device of claim 4, wherein the accumulated position calculator is configured to:
    calculate an average horizontal start position by averaging a current horizontal start position included in the position information of the current frame and a plurality of previous horizontal start positions included in the position information of the plurality of previous frames;
    calculate an average horizontal end position by averaging a current horizontal end position included in the position information of the current frame and a plurality of previous horizontal end positions included in the position information of the plurality of previous frames;

calculate an average vertical start position by averaging a current vertical start position included in the position information of the current frame and a plurality of previous vertical start positions included in the position information of the plurality of previous frames;

calculate an average vertical end position by averaging a current vertical end position included in the position information of the current frame and a plurality of previous vertical end positions included in the position information of the plurality of previous frames; and generate the accumulated position information comprising the average horizontal start position, the average horizontal end position, the average vertical start position, and the average vertical end position.

6. The object detection post-processing device of claim 4, wherein the accumulated position calculator is configured to:

calculate a median horizontal start position by calculating a median value of a current horizontal start position included in the position information of the current frame and a plurality of previous horizontal start positions included in the position information of the plurality of previous frames;

calculate a median horizontal end position by calculating a median value of a current horizontal end position included in the position information of the current frame and a plurality of previous horizontal end positions included in the position information of the plurality of previous frames;

calculate a median vertical start position by calculating a median value of a current vertical start position included in the position information of the current frame and a plurality of previous vertical start positions included in the position information of the plurality of previous frames;

calculate a median vertical end position by calculating a median value of a current vertical end position included in the position information of the current frame and a plurality of previous vertical end positions included in the position information of the plurality of previous frames; and generate the accumulated position information comprising the median horizontal start position, the median horizontal end position, the median vertical start position, and the median vertical end position.

7. The object detection post-processing device of claim 1, wherein the position information storage device is configured to store the position information in a first in first out (FIFO) manner such that an oldest position information from among the position information of the plurality of previous frames is deleted when the position information of the current frame is stored.

8. The object detection post-processing device of claim 1, wherein the state determiner is configured to determine the non-output state as the operating state when the position information of the current frame represents that no object is detected, and wherein the position information determiner is configured to determine the position information of the current frame representing that no object is detected as the final position information in response to the state information representing the non-output state.

9. The object detection post-processing device of claim 1, wherein the state determiner is configured to determine the prompt output state as the operating state when the object is detected, and the position information storage device stores the position information of the previous frames in a number that is less than a first reference number, and wherein the position information determiner is configured to determine the position information of the current frame as the final position information in response to the state information representing the prompt output state.

10. The object detection post-processing device of claim 1, wherein the state determiner is configured to determine the accumulated output state as the operating state when the object is detected, and the position information storage device stores the position information of the previous frames in a number that is greater than or equal to a first reference number, and wherein the position information determiner is configured to determine the accumulated position information as the final position information in response to the state information representing the accumulated output state.

11. The object detection post-processing device of claim 1, further comprising:

a position change determiner configured to compare a difference between a current object detection region represented by the position information of the current frame and a previous object detection region represented by the position information of at least one of the previous frames with a reference position difference, and to determine that an object detection region of the detected object is changed when the difference between the current object detection region and the previous object detection region is greater than or equal to the reference position difference; and a channel change determiner configured to determine that an image channel is changed when the object detection region of the detected object is determined to be changed, and the changed object detection region of the detected object is constant during a second reference number of frames, wherein the state determiner is configured to determine the previous accumulated output state as the operating state when the object is detected, the position information storage device stores the position information of the previous frames in a number that is greater than or equal to a first reference number, the object detection region of the detected object is determined to be changed, and the changed object detection region of the detected object is not constant during the second reference number of frames, and wherein the position information determiner is configured to determine the accumulated position information except for the position information of the current frame as the final position information in response to the state information representing the previous accumulated output state.

12. The object detection post-processing device of claim 11, wherein the state determiner is configured to determine the channel change state as the operating state when the object is detected, the position information storage device stores the position information of the previous frames in the number that is greater than or equal to the first reference number, the object detection region of the detected object is determined to be changed, and the changed object detection region of the detected object is constant during the second reference number of frames, and wherein, in response to the state information representing the channel change state, the position information determiner is configured to reset the position information storage device such that the position information of the plurality of previous frames stored in the position information storage device is deleted, and to determine the position information of the current frame as the final position information.

13. An object detection post-processing device of a display device, the object detection post-processing device comprising:
an input configured to receive position information of an object that is detected from input image data for the display device in a current frame;
a position information storage device configured to accumulatively store the position information of a plurality of previous frames;
a state determiner configured to generate state information representing one of a non-output state, a prompt output state, an accumulated output state, a previous accumulated output state, and a channel change state as an operating state of the object detection post-processing device;
an accumulated position calculator configured to generate accumulated position information according to the position information of the current frame and the position information of the plurality of previous frames when the state information represents the accumulated output state, and to generate the accumulated position information according to the position information of the plurality of previous frames when the state information represents the previous accumulated output state; and
a position information determiner configured to determine final position information according to the state information and the accumulated position information, and to output the final position information.

14. The object detection post-processing device of claim 13, wherein the state determiner is configured to determine the non-output state as the operating state when the position information of the current frame represents that no object is detected, and
wherein the position information determiner is configured to determine the position information of the current frame representing that no object is detected as the final position information in response to the state information representing the non-output state.

15. The object detection post-processing device of claim 13, wherein the state determiner is configured to determine the prompt output state as the operating state when the object is detected, and the position information storage device stores the position information of the previous frames in a number that is less than a first reference number, and
wherein the position information determiner is configured to determine the position information of the current frame as the final position information in response to the state information representing the prompt output state.

16. The object detection post-processing device of claim 13, wherein the state determiner is configured to determine the accumulated output state as the operating state when the object is detected, and the position information storage device stores the position information of the previous frames in a number that is greater than or equal to a first reference number, and
wherein the position information determiner is configured to determine the accumulated position information generated according to the position information of the current frame and the position information of the plurality of previous frames as the final position information in response to the state information representing the accumulated output state.

17. The object detection post-processing device of claim 13, further comprising:
a position change determiner configured to compare a difference between a current object detection region represented by the position information of the current frame and a previous object detection region represented by the position information of at least one of the previous frames with a reference position difference, and to determine that an object detection region of the detected object is changed when the difference between the current object detection region and the previous object detection region is greater than or equal to the reference position difference; and
a channel change determiner configured to determine that an image channel is changed when the object detection region of the detected object is determined to be changed, and the changed object detection region of the detected object is constant during a second reference number of frames,
wherein the state determiner is configured to determine the previous accumulated output state as the operating state when the object is detected, the position information storage device stores the position information of the previous frames in a number that is greater than or equal to a first reference number, the object detection region of the detected object is determined to be changed, and the changed object detection region of the detected object is not constant during the second reference number of frames, and
wherein the position information determiner is configured to determine the accumulated position information generated according to the position information of the plurality of previous frames as the final position information in response to the state information representing the previous accumulated output state.

18. The object detection post-processing device of claim 17, wherein the state determiner is configured to determine the channel change state as the operating state when the object is detected, the position information storage device stores the position information of the previous frames in the number that is greater than or equal to the first reference number, the object detection region of the detected object is determined to be changed, and the changed object detection region of the detected object is constant during the second reference number of frames, and
wherein, in response to the state information representing the channel change state, the position information determiner is configured to reset the position information storage device such that the position information of the plurality of previous frames stored in the position information storage device is deleted, and to determine the position information of the current frame as the final position information.

19. A display device comprising:
a display panel comprising a plurality of pixels;
a data driver configured to provide data signals corresponding to output image data to the plurality of pixels;
a scan driver configured to provide scan signals to the plurality of pixels; and
a controller configured to control the data driver and the scan driver, the controller comprising:
an object detection device configured to detect an object from input image data to generate position information of the detected object;

an object detection post-processing device configured to determine final position information according to the position information of the detected object; and a data compensation device configured to generate the output image data by compensating the input image data according to the final position information, wherein the object detection post-processing device comprises:

an input configured to receive the position information of a current frame from among a plurality of sequential frames;

a position information storage device configured to accumulatively store the position information of a plurality of previous frames from among the plurality of sequential frames;

an accumulated position calculator configured to generate accumulated position information according to the position information of the current frame and the position information of the plurality of previous frames;

a state determiner configured to generate state information representing one of a non-output state, a prompt output state, an accumulated output state, a previous accumulated output state, and a channel change state as an operating state of the object detection post-processing device; and a position information determiner configured to determine the final position information according to the accumulated position information, and to output the final position information, wherein the final position information is determined based on the state information and the accumulated position information.

* * * * *